United States Patent
Winter et al.

(10) Patent No.: US 10,359,848 B2
(45) Date of Patent: Jul. 23, 2019

(54) INPUT DEVICE HAPTICS AND PRESSURE SENSING

(71) Applicant: Microsoft Technology Licensing, LLC, Redmond, WA (US)

(72) Inventors: Andrew E. Winter, Bellevue, WA (US); Brian Rush Cox, Seattle, WA (US); Launnie K E Ginn, Kent, WA (US); David Otto Whitt, Sammamish, WA (US); Aric A. Fitz-Coy, Seattle, WA (US); Carl E. Picciotto, Clyde Hill, WA (US); Gahn Gavyn Yun, Bellevue, WA (US); John Jacob Nelson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/269,594

(22) Filed: Sep. 19, 2016

(65) Prior Publication Data

US 2017/0102770 A1      Apr. 13, 2017

Related U.S. Application Data

(63) Continuation of application No. 14/698,318, filed on Apr. 28, 2015, now Pat. No. 9,448,631, which is a (Continued)

(51) Int. Cl.
*G06F 3/01*    (2006.01)
*G06F 3/041*   (2006.01)
(Continued)

(52) U.S. Cl.
CPC .......... *G06F 3/016* (2013.01); *G06F 3/03547* (2013.01); *G06F 3/044* (2013.01); *G06F 3/0414* (2013.01)

(58) Field of Classification Search
None
See application file for complete search history.

(56) References Cited

U.S. PATENT DOCUMENTS

| 578,325 A | 3/1897 | Fleming |
| 4,046,975 A | 9/1977 | Seeger, Jr. |

(Continued)

FOREIGN PATENT DOCUMENTS

| CN | 1722073 | 1/2006 |
| CN | 101334741 A | 12/2008 |

(Continued)

OTHER PUBLICATIONS

"International Preliminary Report on Patentability", Application No. PCT/US2015/067754, dated Jan. 10, 2017, 10 pages.

(Continued)

*Primary Examiner* — Ryan A Lubit
(74) *Attorney, Agent, or Firm* — Alleman Hall Creasman & Tuttle LLP

(57) ABSTRACT

Input device haptics and pressure sensing techniques are described. An input device includes an outer surface, a pressure sensor and haptic feedback mechanism, and a pressure sensing and haptic feedback module. The outer surface is configured to receive an application of pressure by an object. The pressure sensor and haptic feedback mechanism has one or more piezos configured to detect and quantify an amount of the application of the pressure to the outer surface by the object, the one or more piezos configured to output a signal indicating the quantified amount of the pressure. The pressure sensing and haptic feedback module is configured to receive the signal from the one or more piezos indicating the quantified amount of the pressure and control the haptic feedback of the pressure sensor and haptic feedback mechanism.

20 Claims, 9 Drawing Sheets

Related U.S. Application Data continuation-in-part of application No. 14/144,876, filed on Dec. 31, 2013.

(51) Int. Cl.
  *G06F 3/044* (2006.01)
  *G06F 3/0354* (2013.01)

(56) References Cited

U.S. PATENT DOCUMENTS

| | | |
|---|---|---|
| 4,065,649 A | 12/1977 | Carter et al. |
| 4,243,861 A | 1/1981 | Strandwitz |
| 4,279,021 A | 7/1981 | See et al. |
| 4,302,648 A | 11/1981 | Sado et al. |
| 4,317,013 A | 2/1982 | Larson |
| 4,326,193 A | 4/1982 | Markley et al. |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,890,832 A | 1/1990 | Komaki |
| 5,149,923 A | 9/1992 | Demeo |
| 5,220,521 A | 6/1993 | Kikinis |
| 5,283,559 A | 2/1994 | Kalendra et al. |
| 5,331,443 A | 7/1994 | Stanisci |
| 5,480,118 A | 1/1996 | Cross |
| 5,489,900 A | 2/1996 | Cali et al. |
| 5,510,783 A | 4/1996 | Findlater et al. |
| 5,546,271 A | 8/1996 | Gut et al. |
| 5,548,477 A | 8/1996 | Kumar et al. |
| 5,558,577 A | 9/1996 | Kato |
| 5,576,981 A | 11/1996 | Parker et al. |
| 5,612,719 A | 3/1997 | Beernink et al. |
| 5,617,343 A | 4/1997 | Danielson et al. |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,859,642 A | 1/1999 | Jones |
| 5,862,381 A | 1/1999 | Advani et al. |
| 5,874,697 A | 2/1999 | Selker et al. |
| 5,909,211 A | 6/1999 | Combs et al. |
| 5,926,170 A | 7/1999 | Oba |
| 5,942,733 A | 8/1999 | Allen et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,147,859 A | 11/2000 | Abboud |
| 6,177,926 B1 | 1/2001 | Kunert |
| 6,178,443 B1 | 1/2001 | Lin |
| 6,239,786 B1 | 5/2001 | Burry et al. |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,429,846 B2 | 8/2002 | Rosenberg et al. |
| 6,437,682 B1 | 8/2002 | Vance |
| 6,477,561 B1 | 11/2002 | Robsman |
| 6,506,983 B1 | 1/2003 | Babb et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,738,049 B2 | 5/2004 | Kiser et al. |
| 6,758,615 B2 | 7/2004 | Monney et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,822,635 B2 | 11/2004 | Shahoian |
| 6,856,506 B2 | 2/2005 | Doherty et al. |
| 6,861,961 B2 | 3/2005 | Sandbach et al. |
| 6,864,573 B2 | 3/2005 | Robertson et al. |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 6,977,352 B2 | 12/2005 | Oosawa |
| 7,051,149 B2 | 5/2006 | Wang et al. |
| 7,083,295 B1 | 8/2006 | Hanna |
| 7,091,436 B2 | 8/2006 | Serban |
| 7,091,955 B2 | 8/2006 | Kramer |
| 7,095,404 B2 | 8/2006 | Vincent et al. |
| 7,106,222 B2 | 9/2006 | Ward et al. |
| 7,116,309 B1 | 10/2006 | Kimura et al. |
| 7,123,292 B1 | 10/2006 | Seeger et al. |
| 7,194,662 B2 | 3/2007 | Do et al. |
| 7,202,837 B2 | 4/2007 | Ihara |
| 7,213,991 B2 | 5/2007 | Chapman et al. |
| 7,224,830 B2 | 5/2007 | Nefian et al. |
| 7,245,292 B1 | 7/2007 | Custy |
| 7,277,087 B2 | 10/2007 | Hill et al. |
| 7,280,348 B2 | 10/2007 | Ghosh |
| 7,301,759 B2 | 11/2007 | Hsiung |
| 7,374,312 B2 | 5/2008 | Feng et al. |
| 7,401,992 B1 | 7/2008 | Lin |
| 7,423,557 B2 | 9/2008 | Kang |
| 7,446,276 B2 | 11/2008 | Piesko |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Cutter et al. |
| 7,542,052 B2 | 6/2009 | Solomon et al. |
| 7,557,312 B2 | 7/2009 | Clark et al. |
| 7,558,594 B2 | 7/2009 | Wilson |
| 7,559,834 B1 | 7/2009 | York |
| RE40,891 E | 9/2009 | Yasutake |
| 7,602,384 B2 | 10/2009 | Rosenberg et al. |
| 7,616,192 B2 | 11/2009 | Schroeder |
| 7,620,244 B1 | 11/2009 | Collier |
| 7,622,907 B2 | 11/2009 | Vranish |
| 7,636,921 B2 | 12/2009 | Louie |
| 7,639,876 B2 | 12/2009 | Clary et al. |
| 7,656,392 B2 | 2/2010 | Bolender |
| 7,686,694 B2 | 3/2010 | Cole |
| 7,728,820 B2 | 6/2010 | Rosenberg et al. |
| 7,728,923 B2 | 6/2010 | Kim et al. |
| 7,731,147 B2 | 6/2010 | Rha |
| 7,733,326 B1 | 6/2010 | Adiseshan |
| 7,736,042 B2 | 6/2010 | Park et al. |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,777,972 B1 | 8/2010 | Chen et al. |

(56) References Cited

U.S. PATENT DOCUMENTS

| | | |
|---|---|---|
| 7,782,342 B2 | 8/2010 | Koh |
| 7,813,715 B2 | 10/2010 | McKillop et al. |
| 7,815,358 B2 | 10/2010 | Inditsky |
| 7,817,428 B2 | 10/2010 | Greer, Jr. et al. |
| 7,865,639 B2 | 1/2011 | McCoy et al. |
| 7,880,727 B2 | 2/2011 | Abanami et al. |
| 7,884,807 B2 | 2/2011 | Hovden et al. |
| 7,890,863 B2 | 2/2011 | Grant et al. |
| 7,907,394 B2 | 3/2011 | Richardson et al. |
| D636,397 S | 4/2011 | Green |
| 7,928,964 B2 | 4/2011 | Kolmykov-Zotov et al. |
| 7,936,501 B2 | 5/2011 | Smith et al. |
| 7,945,717 B2 | 5/2011 | Rivalsi |
| 7,952,566 B2 | 5/2011 | Poupyrev et al. |
| 7,970,246 B2 | 6/2011 | Travis et al. |
| 7,973,771 B2 | 7/2011 | Geaghan |
| 7,976,393 B2 | 7/2011 | Haga et al. |
| 7,978,281 B2 | 7/2011 | Vergith et al. |
| 8,016,255 B2 | 9/2011 | Lin |
| 8,018,386 B2 | 9/2011 | Qi et al. |
| 8,018,579 B1 | 9/2011 | Krah |
| 8,022,939 B2 | 9/2011 | Hinata |
| 8,026,904 B2 | 9/2011 | Westerman |
| 8,053,688 B2 | 11/2011 | Conzola et al. |
| 8,063,886 B2 | 11/2011 | Serban et al. |
| 8,065,624 B2 | 11/2011 | Morin et al. |
| 8,069,356 B2 | 11/2011 | Rathi et al. |
| 8,077,160 B2 | 12/2011 | Land et al. |
| 8,090,885 B2 | 1/2012 | Callaghan et al. |
| 8,094,134 B2 | 1/2012 | Suzuki et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,118,681 B2 | 2/2012 | Mattice et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,189,973 B2 | 5/2012 | Travis et al. |
| 8,216,074 B2 | 7/2012 | Sakuma |
| 8,229,509 B2 | 7/2012 | Paek et al. |
| 8,229,522 B2 | 7/2012 | Kim et al. |
| 8,232,963 B2 | 7/2012 | Orsley et al. |
| 8,267,368 B2 | 9/2012 | Torii et al. |
| 8,269,093 B2 | 9/2012 | Naik et al. |
| 8,274,784 B2 | 9/2012 | Franz et al. |
| 8,279,589 B2 | 10/2012 | Kim |
| 8,279,623 B2 | 10/2012 | Idzik et al. |
| 8,322,290 B1 | 12/2012 | Mignano |
| 8,325,144 B1 | 12/2012 | Tierling et al. |
| 8,330,061 B2 | 12/2012 | Rothkopf et al. |
| 8,330,742 B2 | 12/2012 | Reynolds et al. |
| 8,378,972 B2 | 2/2013 | Pance et al. |
| 8,395,587 B2 | 3/2013 | Cauwels et al. |
| 8,403,576 B2 | 3/2013 | Merz |
| 8,416,559 B2 | 4/2013 | Agata et al. |
| 8,421,757 B2 | 4/2013 | Suzuki et al. |
| 8,441,465 B2 | 5/2013 | Radivojevic et al. |
| 8,487,751 B2 | 7/2013 | Laitinen et al. |
| 8,498,100 B1 | 7/2013 | Whitt, III et al. |
| D696,253 S | 12/2013 | Akana et al. |
| 8,599,152 B1 | 12/2013 | Wurtenberger et al. |
| 8,607,651 B2 | 12/2013 | Eventoff |
| 8,633,916 B2 | 1/2014 | Bernstein et al. |
| 8,638,315 B2 | 1/2014 | Algreatly |
| 8,659,555 B2 | 2/2014 | Pihlaja |
| 8,661,363 B2 | 2/2014 | Platzer et al. |
| 8,674,961 B2 | 3/2014 | Posamentier |
| D704,702 S | 5/2014 | Akana et al. |
| 8,757,374 B1 | 6/2014 | Kaiser |
| 8,766,925 B2 | 7/2014 | Perlin et al. |
| 8,831,677 B2 | 9/2014 | Villa-Real |
| 8,836,664 B2 | 9/2014 | Colgate et al. |
| 8,847,895 B2 | 9/2014 | Lim et al. |
| 8,847,897 B2 | 9/2014 | Sakai et al. |
| 8,854,331 B2 | 10/2014 | Heubel et al. |
| 8,907,871 B2 | 12/2014 | Orsley |
| 8,928,581 B2 | 1/2015 | Braun et al. |
| 8,970,525 B1 | 3/2015 | De Los Reyes |
| 9,047,012 B1 | 6/2015 | Bringert et al. |
| 9,063,693 B2 | 6/2015 | Raken et al. |
| 9,073,123 B2 | 7/2015 | Campbell et al. |
| 9,098,304 B2 | 8/2015 | Young et al. |
| 9,176,538 B2 | 11/2015 | Boulanger |
| 9,287,916 B2 | 3/2016 | Wicks et al. |
| 9,348,605 B2 | 5/2016 | Drasnin |
| 9,360,893 B2 | 6/2016 | Bathiche et al. |
| 9,411,436 B2 | 8/2016 | Shaw et al. |
| 9,448,631 B2 | 9/2016 | Winter et al. |
| 9,459,160 B2 | 10/2016 | Shaw et al. |
| 2001/0035697 A1 | 11/2001 | Rueger et al. |
| 2001/0035859 A1 | 11/2001 | Kiser |
| 2002/0000977 A1 | 1/2002 | Vranish |
| 2002/0126445 A1 | 9/2002 | Minaguchi et al. |
| 2002/0134828 A1 | 9/2002 | Sandbach et al. |
| 2002/0154099 A1 | 10/2002 | Oh |
| 2002/0174389 A1 | 11/2002 | Sato et al. |
| 2002/0188721 A1 | 12/2002 | Lemel et al. |
| 2003/0016282 A1 | 1/2003 | Koizumi |
| 2003/0044215 A1 | 3/2003 | Monney et al. |
| 2003/0083131 A1 | 5/2003 | Armstrong |
| 2003/0107557 A1 | 6/2003 | Liebenow |
| 2003/0132916 A1 | 7/2003 | Kramer |
| 2003/0163611 A1 | 8/2003 | Nagao |
| 2003/0197687 A1 | 10/2003 | Shetter |
| 2003/0201982 A1 | 10/2003 | Iesaka |
| 2004/0005184 A1 | 1/2004 | Kim et al. |
| 2004/0100457 A1 | 5/2004 | Mandle |
| 2004/0140998 A1 | 7/2004 | Gravina et al. |
| 2004/0174670 A1 | 9/2004 | Huang et al. |
| 2004/0190239 A1 | 9/2004 | Weng et al. |
| 2004/0194075 A1 | 9/2004 | Molchanov et al. |
| 2004/0212598 A1 | 10/2004 | Kraus et al. |
| 2004/0227721 A1 | 11/2004 | Moilanen et al. |
| 2004/0258924 A1 | 12/2004 | Berger et al. |
| 2004/0267323 A1 | 12/2004 | Dupelle |
| 2004/0268000 A1 | 12/2004 | Barker et al. |
| 2005/0030728 A1 | 2/2005 | Kawashima et al. |
| 2005/0057515 A1 | 3/2005 | Bathiche |
| 2005/0057521 A1 | 3/2005 | Aull et al. |
| 2005/0059441 A1 | 3/2005 | Miyashita |
| 2005/0059489 A1 | 3/2005 | Kim |
| 2005/0146512 A1 | 7/2005 | Hill et al. |
| 2005/0190159 A1 | 9/2005 | Skarine |
| 2005/0240949 A1 | 10/2005 | Liu et al. |
| 2005/0264653 A1 | 12/2005 | Starkweather et al. |
| 2005/0264988 A1 | 12/2005 | Nicolosi |
| 2005/0285703 A1 | 12/2005 | Wheeler et al. |
| 2006/0020903 A1 | 1/2006 | Wang et al. |
| 2006/0028095 A1 | 2/2006 | Maruyama et al. |
| 2006/0049993 A1 | 3/2006 | Lin et al. |
| 2006/0063073 A1 | 3/2006 | Kawashima et al. |
| 2006/0082973 A1 | 4/2006 | Egbert et al. |
| 2006/0085658 A1 | 4/2006 | Allen et al. |
| 2006/0102914 A1 | 5/2006 | Smits et al. |
| 2006/0103633 A1 | 5/2006 | Gioeli |
| 2006/0125799 A1 | 6/2006 | Hillis et al. |
| 2006/0132423 A1 | 6/2006 | Travis |
| 2006/0154725 A1 | 7/2006 | Glaser et al. |
| 2006/0156415 A1 | 7/2006 | Rubinstein et al. |
| 2006/0158433 A1 | 7/2006 | Serban et al. |
| 2006/0181514 A1 | 8/2006 | Newman |
| 2006/0181521 A1 | 8/2006 | Perreault et al. |
| 2006/0187216 A1 | 8/2006 | Trent, Jr. et al. |
| 2006/0195522 A1 | 8/2006 | Miyazaki |
| 2006/0197753 A1 | 9/2006 | Hotelling |
| 2006/0197754 A1 | 9/2006 | Keely |
| 2006/0197755 A1 | 9/2006 | Bawany |
| 2006/0209037 A1 | 9/2006 | Wang et al. |
| 2006/0209050 A1 | 9/2006 | Serban |
| 2006/0238510 A1 | 10/2006 | Panotopoulos et al. |
| 2006/0248597 A1 | 11/2006 | Keneman |

(56) References Cited

U.S. PATENT DOCUMENTS

| | | |
|---|---|---|
| 2007/0018601 A1 | 1/2007 | Steinbach et al. |
| 2007/0043725 A1 | 2/2007 | Hotelling et al. |
| 2007/0047221 A1 | 3/2007 | Park |
| 2007/0051792 A1 | 3/2007 | Wheeler et al. |
| 2007/0056385 A1 | 3/2007 | Lorenz |
| 2007/0057922 A1 | 3/2007 | Schultz et al. |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0152983 A1 | 7/2007 | McKillop et al. |
| 2007/0182663 A1 | 8/2007 | Biech |
| 2007/0182722 A1 | 8/2007 | Hotelling et al. |
| 2007/0200830 A1 | 8/2007 | Yamamoto |
| 2007/0205995 A1 | 9/2007 | Woolley |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236472 A1 | 10/2007 | Bentsen |
| 2007/0236475 A1 | 10/2007 | Wherry |
| 2007/0247338 A1 | 10/2007 | Marchetto |
| 2007/0247432 A1 | 10/2007 | Oakley |
| 2007/0257821 A1 | 11/2007 | Son et al. |
| 2007/0260892 A1 | 11/2007 | Paul et al. |
| 2007/0274094 A1 | 11/2007 | Schultz et al. |
| 2007/0274095 A1 | 11/2007 | Destain |
| 2007/0283179 A1 | 12/2007 | Burnett et al. |
| 2008/0005423 A1 | 1/2008 | Jacobs et al. |
| 2008/0012835 A1 | 1/2008 | Rimon et al. |
| 2008/0013809 A1 | 1/2008 | Zhu et al. |
| 2008/0018608 A1 | 1/2008 | Serban et al. |
| 2008/0018611 A1 | 1/2008 | Serban et al. |
| 2008/0024459 A1 | 1/2008 | Poupyrev et al. |
| 2008/0042994 A1 | 2/2008 | Gillespie et al. |
| 2008/0094367 A1 | 4/2008 | Van De Ven et al. |
| 2008/0104437 A1 | 5/2008 | Lee |
| 2008/0151478 A1 | 6/2008 | Chern |
| 2008/0158185 A1 | 7/2008 | Westerman |
| 2008/0167832 A1 | 7/2008 | Soss |
| 2008/0180411 A1 | 7/2008 | Solomon et al. |
| 2008/0196945 A1 | 8/2008 | Konstas |
| 2008/0202251 A1 | 8/2008 | Serban et al. |
| 2008/0202824 A1 | 8/2008 | Philipp et al. |
| 2008/0219025 A1 | 9/2008 | Spitzer et al. |
| 2008/0224659 A1 | 9/2008 | Singh |
| 2008/0228969 A1 | 9/2008 | Cheah et al. |
| 2008/0232061 A1 | 9/2008 | Wang et al. |
| 2008/0238884 A1 | 10/2008 | Harish |
| 2008/0253822 A1 | 10/2008 | Matias |
| 2008/0297878 A1 | 12/2008 | Brown et al. |
| 2008/0303646 A1 | 12/2008 | Elwell et al. |
| 2008/0309636 A1 | 12/2008 | Feng et al. |
| 2008/0316002 A1 | 12/2008 | Brunet et al. |
| 2008/0316066 A1 | 12/2008 | Minato et al. |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0046416 A1 | 2/2009 | Daley, III |
| 2009/0049979 A1 | 2/2009 | Naik et al. |
| 2009/0065267 A1 | 3/2009 | Sato |
| 2009/0073060 A1 | 3/2009 | Shimasaki et al. |
| 2009/0073957 A1 | 3/2009 | Newland et al. |
| 2009/0079639 A1 | 3/2009 | Hotta et al. |
| 2009/0083562 A1 | 3/2009 | Park et al. |
| 2009/0085878 A1 | 4/2009 | Heubel et al. |
| 2009/0090568 A1 | 4/2009 | Min |
| 2009/0101417 A1 | 4/2009 | Suzuki et al. |
| 2009/0106655 A1 | 4/2009 | Grant et al. |
| 2009/0117955 A1 | 5/2009 | Lo |
| 2009/0127005 A1 | 5/2009 | Zachut et al. |
| 2009/0128374 A1 | 5/2009 | Reynolds |
| 2009/0135142 A1 | 5/2009 | Fu et al. |
| 2009/0140985 A1 | 6/2009 | Liu |
| 2009/0160529 A1 | 6/2009 | Lamborghini |
| 2009/0163147 A1 | 6/2009 | Steigerwald et al. |
| 2009/0167704 A1 | 7/2009 | Terlizzi et al. |
| 2009/0174679 A1 | 7/2009 | Westerman |
| 2009/0182901 A1 | 7/2009 | Callaghan et al. |
| 2009/0195497 A1 | 8/2009 | Fitzgerald et al. |
| 2009/0200148 A1 | 8/2009 | Honmatsu et al. |
| 2009/0219250 A1 | 9/2009 | Ure |
| 2009/0231019 A1 | 9/2009 | Yeh |
| 2009/0231275 A1 | 9/2009 | Odgers |
| 2009/0250267 A1 | 10/2009 | Heubel et al. |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0267892 A1 | 10/2009 | Faubert |
| 2009/0284397 A1 | 11/2009 | Lee et al. |
| 2009/0295739 A1 | 12/2009 | Nagara |
| 2009/0303137 A1 | 12/2009 | Kusaka et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0013613 A1 | 1/2010 | Weston |
| 2010/0026656 A1 | 2/2010 | Hotelling et al. |
| 2010/0038821 A1 | 2/2010 | Jenkins et al. |
| 2010/0039764 A1 | 2/2010 | Locker et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053087 A1 | 3/2010 | Dai et al. |
| 2010/0053534 A1 | 3/2010 | Hsieh et al. |
| 2010/0075517 A1 | 3/2010 | Ni et al. |
| 2010/0077237 A1 | 3/2010 | Sawyers |
| 2010/0079398 A1 | 4/2010 | Shen et al. |
| 2010/0081377 A1 | 4/2010 | Chatterjee et al. |
| 2010/0085321 A1 | 4/2010 | Pundsack |
| 2010/0097198 A1 | 4/2010 | Suzuki |
| 2010/0102182 A1 | 4/2010 | Lin |
| 2010/0103112 A1 | 4/2010 | Yoo et al. |
| 2010/0103131 A1 | 4/2010 | Segal et al. |
| 2010/0103611 A1 | 4/2010 | Yang et al. |
| 2010/0123686 A1 | 5/2010 | Klinghult et al. |
| 2010/0133398 A1 | 6/2010 | Chiu et al. |
| 2010/0137033 A1 | 6/2010 | Lee |
| 2010/0141588 A1 | 6/2010 | Kimura et al. |
| 2010/0142130 A1 | 6/2010 | Wang et al. |
| 2010/0148642 A1 | 6/2010 | Eromaki et al. |
| 2010/0149111 A1 | 6/2010 | Olien |
| 2010/0149134 A1 | 6/2010 | Westerman et al. |
| 2010/0156798 A1 | 6/2010 | Archer |
| 2010/0161522 A1 | 6/2010 | Tirpak et al. |
| 2010/0162109 A1 | 6/2010 | Chatterjee et al. |
| 2010/0162179 A1 | 6/2010 | Porat |
| 2010/0164857 A1 | 7/2010 | Liu et al. |
| 2010/0171708 A1 | 7/2010 | Chuang |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0182263 A1 | 7/2010 | Aunio et al. |
| 2010/0188299 A1 | 7/2010 | Rinehart et al. |
| 2010/0188338 A1 | 7/2010 | Longe |
| 2010/0206614 A1 | 8/2010 | Park et al. |
| 2010/0206644 A1 | 8/2010 | Yeh |
| 2010/0214239 A1 | 8/2010 | Wu |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0238075 A1 | 9/2010 | Pourseyed |
| 2010/0238119 A1 | 9/2010 | Dubrovsky et al. |
| 2010/0238138 A1 | 9/2010 | Goertz et al. |
| 2010/0244577 A1 | 9/2010 | Shimokawa |
| 2010/0245221 A1 | 9/2010 | Khan |
| 2010/0250988 A1 | 9/2010 | Okuda et al. |
| 2010/0274932 A1 | 10/2010 | Kose |
| 2010/0279768 A1 | 11/2010 | Huang et al. |

(56) References Cited

U.S. PATENT DOCUMENTS

| | | |
|---|---|---|
| 2010/0289457 A1 | 11/2010 | Onnerud et al. |
| 2010/0289508 A1 | 11/2010 | Joguet et al. |
| 2010/0295812 A1 | 11/2010 | Burns et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315267 A1 | 12/2010 | Chung |
| 2010/0315348 A1 | 12/2010 | Jellicoe et al. |
| 2010/0315373 A1 | 12/2010 | Steinhauser et al. |
| 2010/0321299 A1 | 12/2010 | Shelley et al. |
| 2010/0321301 A1 | 12/2010 | Casparian et al. |
| 2010/0321330 A1 | 12/2010 | Lim et al. |
| 2010/0321339 A1 | 12/2010 | Kimmel |
| 2010/0325155 A1 | 12/2010 | Skinner et al. |
| 2010/0328230 A1* | 12/2010 | Faubert ............... G06F 1/1626 345/173 |
| 2010/0331059 A1 | 12/2010 | Apgar et al. |
| 2011/0007008 A1 | 1/2011 | Algreatly |
| 2011/0012873 A1 | 1/2011 | Prest et al. |
| 2011/0018556 A1 | 1/2011 | Le et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037379 A1 | 2/2011 | Lecamp et al. |
| 2011/0037705 A1 | 2/2011 | Yilmaz |
| 2011/0037721 A1 | 2/2011 | Cranfill et al. |
| 2011/0043454 A1 | 2/2011 | Modarres et al. |
| 2011/0043990 A1 | 2/2011 | Mickey et al. |
| 2011/0049094 A1* | 3/2011 | Wu ................... G06F 3/0202 216/36 |
| 2011/0050037 A1 | 3/2011 | Rinner et al. |
| 2011/0050587 A1 | 3/2011 | Natanzon et al. |
| 2011/0050630 A1 | 3/2011 | Ikeda |
| 2011/0055407 A1 | 3/2011 | Lydon et al. |
| 2011/0057899 A1 | 3/2011 | Sleeman et al. |
| 2011/0059771 A1 | 3/2011 | Kondo |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0074702 A1 | 3/2011 | Pertuit et al. |
| 2011/0080347 A1* | 4/2011 | Steeves ............... G06F 1/1626 345/173 |
| 2011/0080367 A1 | 4/2011 | Marchand et al. |
| 2011/0084909 A1 | 4/2011 | Hsieh et al. |
| 2011/0095994 A1 | 4/2011 | Birnbaum |
| 2011/0096513 A1 | 4/2011 | Kim |
| 2011/0102326 A1 | 5/2011 | Casparian et al. |
| 2011/0102356 A1 | 5/2011 | Kemppinen et al. |
| 2011/0115712 A1 | 5/2011 | Han et al. |
| 2011/0115747 A1 | 5/2011 | Powell et al. |
| 2011/0118025 A1 | 5/2011 | Lukas et al. |
| 2011/0128227 A1* | 6/2011 | Theimer ............... G06F 3/016 345/167 |
| 2011/0134032 A1 | 6/2011 | Chiu et al. |
| 2011/0134112 A1 | 6/2011 | Koh et al. |
| 2011/0141052 A1 | 6/2011 | Bernstein et al. |
| 2011/0147398 A1 | 6/2011 | Ahee et al. |
| 2011/0148793 A1 | 6/2011 | Ciesla et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0193938 A1 | 8/2011 | Oderwald et al. |
| 2011/0202878 A1 | 8/2011 | Park et al. |
| 2011/0205161 A1 | 8/2011 | Myers et al. |
| 2011/0205163 A1 | 8/2011 | Hinckley et al. |
| 2011/0205372 A1 | 8/2011 | Miramontes |
| 2011/0209093 A1 | 8/2011 | Hinckley |
| 2011/0209097 A1 | 8/2011 | Hinckley |
| 2011/0209098 A1 | 8/2011 | Hinckley et al. |
| 2011/0209099 A1 | 8/2011 | Hinckley |
| 2011/0216266 A1 | 9/2011 | Travis |
| 2011/0222238 A1 | 9/2011 | Staats et al. |
| 2011/0227872 A1 | 9/2011 | Huska et al. |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0241999 A1 | 10/2011 | Thier |
| 2011/0242138 A1 | 10/2011 | Tribble |
| 2011/0248152 A1 | 10/2011 | Svajda et al. |
| 2011/0248920 A1 | 10/2011 | Larsen |
| 2011/0248930 A1* | 10/2011 | Kwok ................... G06F 3/016 345/173 |
| 2011/0248941 A1 | 10/2011 | Abdo et al. |
| 2011/0261001 A1 | 10/2011 | Liu |
| 2011/0261021 A1* | 10/2011 | Modarres ............ G06F 3/016 345/177 |
| 2011/0261083 A1 | 10/2011 | Wilson |
| 2011/0267294 A1 | 11/2011 | Kildal |
| 2011/0267300 A1 | 11/2011 | Serban et al. |
| 2011/0267757 A1 | 11/2011 | Probst et al. |
| 2011/0290686 A1 | 12/2011 | Huang |
| 2011/0291922 A1 | 12/2011 | Stewart et al. |
| 2011/0291951 A1* | 12/2011 | Tong ................. G06F 3/0414 345/173 |
| 2011/0295697 A1 | 12/2011 | Boston et al. |
| 2011/0297566 A1 | 12/2011 | Gallagher et al. |
| 2011/0304577 A1 | 12/2011 | Brown et al. |
| 2011/0304962 A1 | 12/2011 | Su |
| 2011/0306424 A1 | 12/2011 | Kazama et al. |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0013519 A1 | 1/2012 | Hakansson et al. |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0055770 A1 | 3/2012 | Chen |
| 2012/0062245 A1 | 3/2012 | Bao et al. |
| 2012/0068933 A1 | 3/2012 | Larsen |
| 2012/0068957 A1 | 3/2012 | Puskarich et al. |
| 2012/0072167 A1 | 3/2012 | Cretella, Jr. et al. |
| 2012/0075198 A1 | 3/2012 | Sulem et al. |
| 2012/0075221 A1* | 3/2012 | Yasuda ................ B32B 37/02 345/173 |
| 2012/0075249 A1 | 3/2012 | Hoch |
| 2012/0081316 A1 | 4/2012 | Sirpal et al. |
| 2012/0087078 A1 | 4/2012 | Medica et al. |
| 2012/0092279 A1 | 4/2012 | Martin |
| 2012/0092350 A1 | 4/2012 | Ganapathi et al. |
| 2012/0094257 A1 | 4/2012 | Pillischer et al. |
| 2012/0098751 A1 | 4/2012 | Liu |
| 2012/0099263 A1 | 4/2012 | Lin |
| 2012/0099749 A1 | 4/2012 | Rubin et al. |
| 2012/0105481 A1 | 5/2012 | Baek et al. |
| 2012/0106078 A1 | 5/2012 | Probst et al. |
| 2012/0106082 A1 | 5/2012 | Wu et al. |
| 2012/0113579 A1 | 5/2012 | Agata et al. |
| 2012/0115553 A1 | 5/2012 | Mahe et al. |
| 2012/0117409 A1 | 5/2012 | Lee et al. |
| 2012/0127071 A1 | 5/2012 | Jitkoff et al. |
| 2012/0127118 A1 | 5/2012 | Nolting et al. |
| 2012/0127646 A1 | 5/2012 | Moscovitch |
| 2012/0139844 A1 | 6/2012 | Ramstein et al. |
| 2012/0140396 A1 | 6/2012 | Zeliff et al. |
| 2012/0145525 A1 | 6/2012 | Ishikawa |
| 2012/0155015 A1 | 6/2012 | Govindasamy et al. |
| 2012/0162693 A1 | 6/2012 | Ito |
| 2012/0175487 A1 | 7/2012 | Goto |
| 2012/0182242 A1 | 7/2012 | Lindahl et al. |
| 2012/0188180 A1 | 7/2012 | Yang et al. |
| 2012/0194393 A1 | 8/2012 | Uttermann et al. |
| 2012/0194448 A1 | 8/2012 | Rothkopf |

(56) References Cited

U.S. PATENT DOCUMENTS

| | | |
|---|---|---|
| 2012/0200532 A1 | 8/2012 | Powell et al. |
| 2012/0200802 A1 | 8/2012 | Large |
| 2012/0206401 A1 | 8/2012 | Lin et al. |
| 2012/0206937 A1 | 8/2012 | Travis et al. |
| 2012/0223866 A1 | 9/2012 | Ayala Vazquez et al. |
| 2012/0224073 A1 | 9/2012 | Miyahara |
| 2012/0229401 A1 | 9/2012 | Birnbaum et al. |
| 2012/0235635 A1 | 9/2012 | Sato |
| 2012/0235921 A1 | 9/2012 | Laubach |
| 2012/0235942 A1 | 9/2012 | Shahoian et al. |
| 2012/0242588 A1 | 9/2012 | Myers et al. |
| 2012/0246377 A1 | 9/2012 | Bhesania et al. |
| 2012/0249459 A1 | 10/2012 | Sashida et al. |
| 2012/0249474 A1 | 10/2012 | Pratt et al. |
| 2012/0256848 A1 | 10/2012 | Madabusi Srinivasan |
| 2012/0256959 A1 | 10/2012 | Ye et al. |
| 2012/0268412 A1 | 10/2012 | Cruz-Hernandez et al. |
| 2012/0268911 A1 | 10/2012 | Lin |
| 2012/0274578 A1 | 11/2012 | Snow et al. |
| 2012/0274811 A1 | 11/2012 | Bakin |
| 2012/0287562 A1 | 11/2012 | Wu et al. |
| 2012/0297339 A1 | 11/2012 | Ito |
| 2012/0299866 A1 | 11/2012 | Pao et al. |
| 2012/0300275 A1 | 11/2012 | Vilardell et al. |
| 2012/0304199 A1 | 11/2012 | Homma et al. |
| 2012/0312955 A1 | 12/2012 | Randolph |
| 2012/0327025 A1 | 12/2012 | Huska et al. |
| 2012/0328349 A1 | 12/2012 | Isaac et al. |
| 2013/0009892 A1 | 1/2013 | Salmela et al. |
| 2013/0016059 A1 | 1/2013 | Lowles et al. |
| 2013/0016060 A1 | 1/2013 | Pereverzev et al. |
| 2013/0044059 A1 | 2/2013 | Fu |
| 2013/0047747 A1 | 2/2013 | Joung |
| 2013/0063364 A1 | 3/2013 | Moore |
| 2013/0063389 A1 | 3/2013 | Moore |
| 2013/0063873 A1 | 3/2013 | Wodrich et al. |
| 2013/0076646 A1 | 3/2013 | Krah et al. |
| 2013/0076652 A1 | 3/2013 | Leung |
| 2013/0088431 A1 | 4/2013 | Ballagas et al. |
| 2013/0088442 A1 | 4/2013 | Lee |
| 2013/0094131 A1 | 4/2013 | O'Donnell et al. |
| 2013/0097534 A1 | 4/2013 | Lewin et al. |
| 2013/0100052 A1 | 4/2013 | Yilmaz |
| 2013/0106766 A1 | 5/2013 | Yilmaz et al. |
| 2013/0107144 A1 | 5/2013 | Marhefka et al. |
| 2013/0118933 A1 | 5/2013 | Wang et al. |
| 2013/0127735 A1 | 5/2013 | Motoyama |
| 2013/0141370 A1 | 6/2013 | Wang et al. |
| 2013/0167663 A1 | 7/2013 | Eventoff |
| 2013/0194235 A1 | 8/2013 | Zanone et al. |
| 2013/0201115 A1 | 8/2013 | Heubel |
| 2013/0207917 A1 | 8/2013 | Cruz-Hernandez et al. |
| 2013/0222286 A1 | 8/2013 | Kang et al. |
| 2013/0227836 A1 | 9/2013 | Whitt, III et al. |
| 2013/0228433 A1 | 9/2013 | Shaw |
| 2013/0229273 A1 | 9/2013 | Nodar Cortizo et al. |
| 2013/0229356 A1 | 9/2013 | Marwah et al. |
| 2013/0229386 A1 | 9/2013 | Bathiche |
| 2013/0249802 A1* | 9/2013 | Yasutake ............... G06F 3/016 345/168 |
| 2013/0275058 A1 | 10/2013 | Awad |
| 2013/0278542 A1 | 10/2013 | Stephanou et al. |
| 2013/0278552 A1 | 10/2013 | Kamin-Lyndgaard |
| 2013/0300683 A1* | 11/2013 | Birnbaum ............... G06F 3/016 345/173 |
| 2013/0304941 A1 | 11/2013 | Drasnin |
| 2013/0304944 A1 | 11/2013 | Young |
| 2013/0311881 A1 | 11/2013 | Binbaum et al. |
| 2013/0314341 A1 | 11/2013 | Lee et al. |
| 2013/0321291 A1 | 12/2013 | Sim |
| 2013/0335209 A1 | 12/2013 | Cruz-Hernandez et al. |
| 2013/0335330 A1 | 12/2013 | Lane |
| 2013/0335902 A1 | 12/2013 | Campbell |
| 2013/0335903 A1 | 12/2013 | Raken |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0008203 A1 | 1/2014 | Nathan et al. |
| 2014/0009429 A1 | 1/2014 | Verweg et al. |
| 2014/0020484 A1 | 1/2014 | Shaw et al. |
| 2014/0022177 A1 | 1/2014 | Shaw |
| 2014/0028624 A1 | 1/2014 | Marsden et al. |
| 2014/0055375 A1 | 2/2014 | Kim et al. |
| 2014/0062933 A1 | 3/2014 | Coulson et al. |
| 2014/0062934 A1 | 3/2014 | Coulson et al. |
| 2014/0083207 A1 | 3/2014 | Eventoff |
| 2014/0085247 A1 | 3/2014 | Leung et al. |
| 2014/0092003 A1 | 4/2014 | Liu |
| 2014/0092055 A1 | 4/2014 | Radivojevic et al. |
| 2014/0098058 A1 | 4/2014 | Baharav et al. |
| 2014/0104189 A1 | 4/2014 | Marshall et al. |
| 2014/0139436 A1 | 5/2014 | Ramstein et al. |
| 2014/0139452 A1 | 5/2014 | Levesque et al. |
| 2014/0139472 A1 | 5/2014 | Takenaka |
| 2014/0197058 A1 | 7/2014 | Huet et al. |
| 2014/0198072 A1* | 7/2014 | Schuele ............... G06F 3/044 345/174 |
| 2014/0204059 A1 | 7/2014 | Geaghan |
| 2014/0210742 A1 | 7/2014 | Delattre et al. |
| 2014/0221098 A1 | 8/2014 | Boulanger |
| 2014/0225821 A1 | 8/2014 | Kim et al. |
| 2014/0225857 A1 | 8/2014 | Ma |
| 2014/0230575 A1 | 8/2014 | Picciotto et al. |
| 2014/0232657 A1 | 8/2014 | Aviles et al. |
| 2014/0232679 A1 | 8/2014 | Whitman et al. |
| 2014/0253305 A1 | 9/2014 | Rosenberg et al. |
| 2014/0306914 A1 | 10/2014 | Kagayama |
| 2014/0320393 A1 | 10/2014 | Modarres et al. |
| 2014/0332417 A1 | 11/2014 | Wicks et al. |
| 2014/0354587 A1 | 12/2014 | Mohindra et al. |
| 2014/0370937 A1 | 12/2014 | Park et al. |
| 2015/0084865 A1 | 3/2015 | Shaw et al. |
| 2015/0084909 A1 | 3/2015 | Worfolk et al. |
| 2015/0097786 A1 | 4/2015 | Behles et al. |
| 2015/0103427 A1 | 4/2015 | Beck |
| 2015/0116205 A1 | 4/2015 | Westerman et al. |
| 2015/0160778 A1 | 6/2015 | Kim et al. |
| 2015/0185842 A1 | 7/2015 | Picciotto et al. |
| 2015/0185950 A1 | 7/2015 | Watanabe et al. |
| 2015/0193034 A1 | 7/2015 | Jeong et al. |
| 2015/0227207 A1 | 8/2015 | Winter et al. |
| 2015/0241929 A1 | 8/2015 | Raken et al. |
| 2015/0242012 A1 | 8/2015 | Petcavich et al. |
| 2015/0253872 A1 | 9/2015 | Reyes |
| 2015/0293592 A1 | 10/2015 | Cheong et al. |
| 2015/0301642 A1 | 10/2015 | Hanauer et al. |
| 2015/0331150 A1 | 11/2015 | Furholz et al. |
| 2015/0370376 A1* | 12/2015 | Harley ............... G06F 3/0414 345/174 |
| 2016/0018894 A1* | 1/2016 | Yliaho ............... G06F 3/016 345/177 |
| 2016/0063828 A1 | 3/2016 | Moussette et al. |
| 2016/0070398 A1 | 3/2016 | Worfolk |
| 2016/0085268 A1 | 3/2016 | Aurongzeb et al. |
| 2016/0135742 A1 | 5/2016 | Cobbett et al. |
| 2016/0147310 A1 | 5/2016 | Pate |
| 2016/0170935 A1 | 6/2016 | Drasnin |
| 2016/0195955 A1 | 7/2016 | Picciotto et al. |
| 2016/0357296 A1 | 12/2016 | Picciotto et al. |
| 2017/0023418 A1 | 1/2017 | Shaw et al. |
| 2017/0102770 A1 | 4/2017 | Winter et al. |
| 2017/0212591 A1 | 7/2017 | Churikov et al. |
| 2017/0255276 A1 | 9/2017 | Shaw et al. |

FOREIGN PATENT DOCUMENTS

| | | |
|---|---|---|
| CN | 101763166 | 6/2010 |
| CN | 101825967 A | 9/2010 |
| CN | 101938396 A | 1/2011 |
| CN | 102117121 | 7/2011 |
| CN | 102292687 | 12/2011 |
| CN | 102356624 | 2/2012 |
| CN | 202404524 U | 8/2012 |
| CN | 102906673 A | 1/2013 |

(56) References Cited

FOREIGN PATENT DOCUMENTS

| | | |
|---|---|---|
| CN | 103440102 A | 12/2013 |
| EP | 1223722 | 7/2002 |
| EP | 1591891 | 11/2005 |
| EP | 2353978 | 8/2011 |
| EP | 2381340 | 10/2011 |
| EP | 2584432 | 4/2013 |
| GB | 2178570 | 2/1987 |
| JP | 10326124 | 12/1998 |
| JP | 1173239 | 3/1999 |
| JP | 11345041 | 12/1999 |
| KR | 1020110087178 | 8/2011 |
| NL | 1038411 | 5/2012 |
| WO | WO-2010011983 | 1/2010 |
| WO | WO-2012036717 | 3/2012 |
| WO | WO-2012173305 | 12/2012 |
| WO | WO-2013169299 | 11/2013 |
| WO | WO-2014098946 | 6/2014 |

OTHER PUBLICATIONS

"International Preliminary Report on Patentability", Application No. PCT/US2016/031699, dated Feb. 22, 2017, 6 pages.
"Non-Final Office Action", U.S. Appl. No. 14/591,704, dated Mar. 10, 2017, 26 pages.
"Non-Final Office Action", U.S. Appl. No. 15/283,913, dated Feb. 10, 2017, 20 pages.
"Accessing Device Sensors", retrieved from <https://developer.palm.com/content/api/dev-guide/pdk/accessing-device-sensors.html> on May 25, 2012, 2011, 4 pages.
"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.
"Advanced Configuration and Power Management Specification", Intel Corporation, Microsoft Corporation, Toshiba Corp. Revision 1, Dec. 22, 1996, 364 pages.
"Advisory Action", U.S. Appl. No. 13/975,087, dated Nov. 16, 2015, 3 pages.
"Capacitive Touch Sensors—Application Fields, Technology Overview and Implementation Example", Fujitsu Microelectronics Europe GmbH; retrieved from http://www.fujitsu.com/downloads/MICRO/fme/articles/fujitsu-whitepaper-capacitive-touch-sensors.pdf on Jul. 20, 2011, Jan. 12, 2010, 12 pages.
"Cholesteric Liquid Crystal", Retrieved from: <http://en.wikipedia.org/wiki/Cholesteric_liquid_crystal> on Aug. 6, 2012, Jun. 10, 2012, 2 pages.
"Cirago Slim Case®—Protective case with built-in kickstand for your iPhone 5", Retrieved from <http://cirago.com/wordpress/wp-content/uploads/2012/10/ipc1500brochure1.pdf> on Jan. 29, 2013, Jan. 2013, 1 page.
"Corrected Notice of Allowance", U.S. Appl. No. 13/470,633, dated Apr. 9, 2013, 2 pages.
"Corrected Notice of Allowance", U.S. Appl. No. 13/470,633, dated Jul. 2, 2013, 2 pages.
"Corrected Notice of Allowance", U.S. Appl. No. 13/527,263, dated Jan. 4, 2016, 2 pages.
"Corrected Notice of Allowance", U.S. Appl. No. 13/527,263, dated Jan. 11, 2016, 2 pages.
"Corrected Notice of Allowance", U.S. Appl. No. 13/527,263, dated Mar. 7, 2016, 2 pages.
"Corrected Notice of Allowance", U.S. Appl. No. 13/527,263, dated Apr. 12, 2016, 2 pages.
"Corrected Notice of Allowance", U.S. Appl. No. 13/527,263, dated Apr. 25, 2016, 2 pages.
"Corrected Notice of Allowance", U.S. Appl. No. 13/603,918, dated May 8, 2015, 2 pages.
"Corrected Notice of Allowance", U.S. Appl. No. 13/645,405, dated Jul. 7, 2015, 2 pages.
"Corrected Notice of Allowance", U.S. Appl. No. 14/033,290, dated Jul. 13, 2016, 2 pages.
"Corrected Notice of Allowance", U.S. Appl. No. 14/033,508, dated Jun. 16, 2016, 2 pages.
"Corrected Notice of Allowance", U.S. Appl. No. 14/033,508, dated Sep. 9, 2016, 2 pages.
"Corrected Notice of Allowance", U.S. Appl. No. 14/698,318, dated Jun. 9, 2016, 2 pages.
"Developing Next-Generation Human Interfaces using Capacitive and Infrared Proximity Sensing", Silicon Laboratories, Inc., Available at <http://www.silabs.com/pages/DownloadDoc.aspx?FILEURL=support%20documents/technicaldocs/capacitive%20and%20proximity%20sensing_wp.pdf&src=SearchResults>, Aug. 30, 2010, pp. 1-10.
"Directional Backlighting for Display Panels", U.S. Appl. No. 13/021,448, filed Feb. 4, 2011, 38 pages.
"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.
"Enhancing Your Device Design Through Tactile Feedback", Immersion, Available at <http://www.immersion.com/docs/Enhancing-Device-Design-Through-Tactile-Feedback.pdf>, Apr. 2011, pp. 1-7.
"Ex Parte Quayle Action", U.S. Appl. No. 13/599,763, Nov. 14, 2014, 6 pages.
"Examiner' Answer to Appeal Brief", U.S. Appl. No. 13/974,994, May 18, 2016, 40 pages.
"Final Office Action", U.S. Appl. No. 13/471,001, dated Jul. 25, 2013, 20 pages.
"Final Office Action", U.S. Appl. No. 13/527,263, dated Jan. 27, 2015, 7 pages.
"Final Office Action", U.S. Appl. No. 13/603,918, dated Mar. 21, 2014, 14 pages.
"Final Office Action", U.S. Appl. No. 13/647,479, dated Sep. 17, 2015, 11 pages.
"Final Office Action", U.S. Appl. No. 13/647,479, dated Dec. 12, 2014, 12 pages.
"Final Office Action", U.S. Appl. No. 13/651,195, dated Apr. 18, 2013, 13 pages.
"Final Office Action", U.S. Appl. No. 13/651,232, dated May 21, 2013, 21 pages.
"Final Office Action", U.S. Appl. No. 13/651,287, dated May 3, 2013, 16 pages.
"Final Office Action", U.S. Appl. No. 13/651,976, dated Jul. 25, 2013, 21 pages.
"Final Office Action", U.S. Appl. No. 13/653,321, dated Aug. 2, 2013, 17 pages.
"Final Office Action", U.S. Appl. No. 13/655,065, dated Apr. 2, 2015, 23 pages.
"Final Office Action", U.S. Appl. No. 13/655,065, dated Aug. 8, 2014, 20 pages.
"Final Office Action", U.S. Appl. No. 13/769,356, dated Mar. 23, 2016, 15 pages.
"Final Office Action", U.S. Appl. No. 13/769,356, dated Apr. 10, 2015, 9 pages.
"Final Office Action", U.S. Appl. No. 13/782,137, dated Feb. 10, 2016, 21 pages.
"Final Office Action", U.S. Appl. No. 13/782,137, dated May 8, 2015, 19 pages.
"Final Office Action", U.S. Appl. No. 13/974,749, dated Mar. 23, 2016, 22 pages.
"Final Office Action", U.S. Appl. No. 13/974,749, dated May 21, 2015, 19 pages.
"Final Office Action", U.S. Appl. No. 13/974,749, dated Sep. 5, 2014, 18 pages.
"Final Office Action", U.S. Appl. No. 13/974,994, dated Jun. 10, 2015, 28 pages.
"Final Office Action", U.S. Appl. No. 13/974,994, dated Oct. 6, 2014, 26 pages.
"Final Office Action", U.S. Appl. No. 13/975,087, dated Aug. 7, 2015, 16 pages.
"Final Office Action", U.S. Appl. No. 13/975,087, dated Sep. 10, 2014, 19 pages.
"Final Office Action", U.S. Appl. No. 14/033,510, dated Jun. 5, 2015, 24 pages.

(56) References Cited

OTHER PUBLICATIONS

"Final Office Action", U.S. Appl. No. 14/033,510, dated Aug. 21, 2014, 18 pages.
"Final Office Action", U.S. Appl. No. 14/144,876, dated Feb. 3, 2016, 27 pages.
"Final Office Action", U.S. Appl. No. 14/697,501, dated Apr. 18, 2016, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Office Action", CN Application No. 201310316114.2, dated Apr. 18, 2016, 11 pages.
"Foreign Office Action", CN Application No. 201310316114.2, dated Sep. 29, 2015, 13 pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"How to Use the iPad's Onscreen Keyboard", Retrieved from <http://www.dummies.com/how-to/content/how-to-use-the-ipads-onscreen-keyboard.html> on Aug. 28, 2012, 2012, 3 pages.
"iControlPad 2—The open source controller", Retrieved from <http://www.kickstarter.com/projects/1703567677/icontrolpad-2-the-open-source-controller> on Nov. 20, 2012, 2012, 15 pages.
"i-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"International Preliminary Report on Patentability", Application No. PCT/US2014/068687, dated Mar. 11, 2016, 7 pages.
"International Preliminary Report on Patentability", Application No. PCT/US2014/056185, dated Dec. 23, 2015, 7 pages.
"International Search Report and Written Opinion", Application No. PCT/US2014/068687, dated Mar. 18, 2015, 10 pages.
"International Search Report and Written Opinion", Application No. PCT/US2014/016151, dated May 16, 2014, 10 pages.
"International Search Report and Written Opinion", Application No. PCT/US2014/016743, dated Jul. 24, 2014, 10 pages.
"International Search Report and Written Opinion", Application No. PCT/US2014/056185, dated Dec. 4, 2014, 10 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/040968, dated Sep. 5, 2013, 11 pages.
"International Search Report and Written Opinion", Application No. PCT/US2013/044871, dated Aug. 14, 2013, 12 pages.
"International Search Report and Written Opinion", Application No. PCT/US2015/067754, dated Apr. 7, 2016, 13 pages.
"International Search Report and Written Opinion", Application No. PCT/US2014/014522, dated Jun. 6, 2014, 13 pages.
"International Search Report and Written Opinion", Application No. PCT/US2016/025966, dated Jun. 15, 2016, 15 pages.
"International Search Report and Written Opinion", Application No. PCT/US2013/045283, dated Mar. 12, 2014, 19 pages.
"International Search Report and Written Opinion", Application No. PCT/US2013/044873, dated Nov. 22, 2013, 9 pages.
"International Search Report and Written Opinion", Application No. PCT/US2013/045049, dated Sep. 16, 2013, 9 pages.
"Membrane Keyboards & Membrane Keypads", Retrieved from: <http://www.pannam.com/> on May 9, 2012, Mar. 4, 2009, 2 pages.
"Microsoft Tablet PC", Retrieved from < http://web.archive.org/web/20120622064335/https://en.wikipedia.org/wiki/Microsoft_Tablet_PC> on Jun. 4, 2014, Jun. 21, 2012, 9 pages.
"Motion Sensors", Android Developers—retrieved from <http://developer.android.com/guide/topics/sensors/sensors_motion.html> on May 25, 2012, 2012, 7 pages.
"MPC Fly Music Production Controller", AKAI Professional, Retrieved from: <http://www.akaiprompc.com/mpc-fly> on Jul. 9, 2012, 4 pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/021,448, dated Dec. 13, 2012, 9 pages.
"Non-Final Office Action", U.S. Appl. No. 13/471,001, dated Feb. 19, 2013, 15 pages.
"Non-Final Office Action", U.S. Appl. No. 13/471,139, dated Mar. 21, 2013, 12 pages.
"Non-Final Office Action", U.S. Appl. No. 13/471,202, dated Feb. 11, 2013, 10 pages.
"Non-Final Office Action", U.S. Appl. No. 13/471,336, dated Jan. 18, 2013, 14 pages.
"Non-Final Office Action", U.S. Appl. No. 13/527,263, dated Apr. 3, 2014, 6 pages.
"Non-Final Office Action", U.S. Appl. No. 13/527,263, dated Jul. 19, 2013, 5 pages.
"Non-Final Office Action", U.S. Appl. No. 13/563,435, dated Jun. 14, 2013, 6 pages.
"Non-Final Office Action", U.S. Appl. No. 13/564,520, dated Jun. 19, 2013, 8 pages.
"Non-Final Office Action", U.S. Appl. No. 13/565,124, dated Jun. 17, 2013, 5 pages.
"Non-Final Office Action", U.S. Appl. No. 13/599,763, dated May 28, 2014, 6 pages.
"Non-Final Office Action", U.S. Appl. No. 13/603,918, dated Sep. 2, 2014, 13 pages.
"Non-Final Office Action", U.S. Appl. No. 13/603,918, dated Dec. 19, 2013, 12 pages.
"Non-Final Office Action", U.S. Appl. No. 13/645,405, dated Jan. 31, 2014, 6 pages.
"Non-Final Office Action", U.S. Appl. No. 13/645,405, dated Aug. 11, 2014, 5 pages.
"Non-Final Office Action", U.S. Appl. No. 13/647,479, dated Apr. 28, 2015, 11 pages.
"Non-Final Office Action", U.S. Appl. No. 13/647,479, dated Jul. 3, 2014, 10 pages.
"Non-Final Office Action", U.S. Appl. No. 13/651,195, dated Jan. 2, 2013, 14 pages.
"Non-Final Office Action", U.S. Appl. No. 13/651,232, dated Jan. 17, 2013, 15 pages.
"Non-Final Office Action", U.S. Appl. No. 13/651,272, dated Feb. 12, 2013, 10 pages.
"Non-Final Office Action", U.S. Appl. No. 13/651,287, dated Jan. 29, 2013, 13 pages.
"Non-Final Office Action", U.S. Appl. No. 13/651,304, dated Mar. 22, 2013, 9 pages.
"Non-Final Office Action", U.S. Appl. No. 13/651,327, dated Mar. 22, 2013, 6 pages.
"Non-Final Office Action", U.S. Appl. No. 13/651,726, dated Apr. 15, 2013, 6 pages.
"Non-Final Office Action", U.S. Appl. No. 13/651,871, dated Mar. 18, 2013, 14 pages.
"Non-Final Office Action", U.S. Appl. No. 13/651,871, dated Jul. 1, 2013, 5 pages.
"Non-Final Office Action", U.S. Appl. No. 13/651,976, dated Feb. 22, 2013, 16 pages.
"Non-Final Office Action", U.S. Appl. No. 13/653,321, dated Feb. 1, 2013, 13 pages.
"Non-Final Office Action", U.S. Appl. No. 13/653,682, dated Feb. 7, 2013, 11 pages.
"Non-Final Office Action", U.S. Appl. No. 13/653,682, dated Jun. 3, 2013, 14 pages.
"Non-Final Office Action", U.S. Appl. No. 13/655,065, dated Apr. 24, 2014, 16 pages.
"Non-Final Office Action", U.S. Appl. No. 13/655,065, dated Aug. 19, 2015, 18 pages.

(56) References Cited

OTHER PUBLICATIONS

"Non-Final Office Action", U.S. Appl. No. 13/655,065, dated Dec. 19, 2014, 24 pages.
"Non-Final Office Action", U.S. Appl. No. 13/656,055, dated Apr. 23, 2013, 11 pages.
"Non-Final Office Action", U.S. Appl. No. 13/656,520, dated Feb. 1, 2013, 15 pages.
"Non-Final Office Action", U.S. Appl. No. 13/656,520, dated Jun. 5, 2013, 8 pages.
"Non-Final Office Action", U.S. Appl. No. 13/759,875, dated Aug. 1, 2014, 16 pages.
"Non-Final Office Action", U.S. Appl. No. 13/769,356, dated Jun. 30, 2016, 16 pages.
"Non-Final Office Action", U.S. Appl. No. 13/769,356, dated Oct. 19, 2015, 23 pages.
"Non-Final Office Action", U.S. Appl. No. 13/769,356, dated Nov. 20, 2014, 16 pages.
"Non-Final Office Action", U.S. Appl. No. 13/782,137, dated Jan. 30, 2015, 12 pages.
"Non-Final Office Action", U.S. Appl. No. 13/782,137, dated Jun. 8, 2016, 22 pages.
"Non-Final Office Action", U.S. Appl. No. 13/782,137, dated Oct. 6, 2015, 20 pages.
"Non-Final Office Action", U.S. Appl. No. 13/974,749, dated Feb. 12, 2015, 15 pages.
"Non-Final Office Action", U.S. Appl. No. 13/974,749, dated May 8, 2014, 16 pages.
"Non-Final Office Action", U.S. Appl. No. 13/974,749, dated Dec. 3, 2015, 20 pages.
"Non-Final Office Action", U.S. Appl. No. 13/974,994, dated Jan. 23, 2015, 26 pages.
"Non-Final Office Action", U.S. Appl. No. 13/974,994, dated Jun. 4, 2014, 24 pages.
"Non-Final Office Action", U.S. Appl. No. 13/975,087, dated Feb. 27, 2015, 20 pages.
"Non-Final Office Action", U.S. Appl. No. 13/975,087, dated May 8, 2014, 18 pages.
"Non-Final Office Action", U.S. Appl. No. 14/033,290, dated Dec. 3, 2015, 7 pages.
"Non-Final Office Action", U.S. Appl. No. 14/033,508, dated Dec. 3, 2015, 14 pages.
"Non-Final Office Action", U.S. Appl. No. 14/033,510, dated Feb. 12, 2015, 17 pages.
"Non-Final Office Action", U.S. Appl. No. 14/033,510, dated Jun. 5, 2014, 16 pages.
"Non-Final Office Action", U.S. Appl. No. 14/144,876, dated Jun. 10, 2015, 23 pages.
"Non-Final Office Action", U.S. Appl. No. 14/144,876, dated Jul. 6, 2016, 33 pages.
"Non-Final Office Action", U.S. Appl. No. 14/591,704, dated Jun. 7, 2016, 32 pages.
"Non-Final Office Action", U.S. Appl. No. 14/697,501, dated Sep. 29, 2015, 11 pages.
"Notice of Allowance", U.S. Appl. No. 13/470,633, dated Mar. 22, 2013, 7 pages.
"Notice of Allowance", U.S. Appl. No. 13/471,202, dated May 28, 2013, 7 pages.
"Notice of Allowance", U.S. Appl. No. 13/527,263, dated Dec. 9, 2015, 6 pages.
"Notice of Allowance", U.S. Appl. No. 13/599,763, dated Feb. 18, 2015, 4 pages.
"Notice of Allowance", U.S. Appl. No. 13/603,918, dated Jan. 22, 2015, 8 pages.
"Notice of Allowance", U.S. Appl. No. 13/645,405, dated Mar. 26, 2015, 6 pages.
"Notice of Allowance", U.S. Appl. No. 13/647,479, dated Jan. 14, 2016, 8 pages.
"Notice of Allowance", U.S. Appl. No. 13/651,195, dated Jul. 8, 2013, 9 pages.
"Notice of Allowance", U.S. Appl. No. 13/651,272, dated May 2, 2013, 7 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"Notice of Allowance", U.S. Appl. No. 13/759,875, dated Jul. 31, 2015, 9 pages.
"Notice of Allowance", U.S. Appl. No. 14/033,290, dated Mar. 30, 2016, 5 pages.
"Notice of Allowance", U.S. Appl. No. 14/033,508, dated May 6, 2016, 9 pages.
"On-Screen Keyboard for Windows 7, Vista, XP with Touchscreen", Retrieved from <www.comfort-software.com/on-screen-keyboard.html> on Aug. 28, 2012, Feb. 2, 2011, 3 pages.
"Optical Sensors in Smart Mobile Devices", ON Semiconductor, TND415/D, Available at <http://www.onsemi.jp/pub_link/Collateral/TND415-D.PDF>, Nov. 2010, pp. 1-13.
"Optics for Displays: Waveguide-based Wedge Creates Collimated Display Backlight", OptoIQ, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010, Jan. 1, 2010, 3 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/603,918, dated Nov. 27, 2013, 8 pages.
"Restriction Requirement", U.S. Appl. No. 13/471,139, dated Jan. 17, 2013, 7 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 13/715,229, dated Aug. 13, 2013, 7 pages.
"Second Written Opinion", Application No. PCT/US2014/056185, dated Sep. 15, 2015, 5 pages.
"Second Written Opinion", Application No. PCT/US2014/068687, dated Nov. 12, 2015, 6 pages.
"Smart Board™ Interactive Display Frame Pencil Pack", Available at <http://downloads01.smarttech.com/media/sitecore/en/support/product/sbfpd/400series(in teractivedisplayframes)/guides/smartboardinteractivedisplayframepencilpackv12mar09.pd f>, 2009, 2 pages.
"Snugg iPad 3 Keyboard Case—Cover Ultra Slim Bluetooth Keyboard Case for the iPad 3 & iPad 2", Retrieved from < https://web.archive.org/web/20120810202056/http://www.amazon. com/Snugg-iPad-Keyboard-Case-Bluetooth/dp/B008CCHXJE> on Jan. 23, 2015, Aug. 10, 2012, 4 pages.
"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012, 2011, 4 pages.
"Supplemental Notice of Allowance", U.S. Appl. No. 13/603,918, dated Apr. 20, 2015, 8 pages.
"Supplemental Notice of Allowance", U.S. Appl. No. 14/698,318, dated Aug. 15, 2016, 2 pages.
"Tactile Feedback Solutions Using Piezoelectric Actuators", Available at: http://www.eetimes.com/document.asp?doc_id=1278418, Nov. 17, 2010, 6 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.

(56) References Cited

OTHER PUBLICATIONS

"Tilt Shift Lenses: Perspective Control", retrieved from http://www.cambridgeincolour.com/tutorials/tilt-shift-lenses1.htm, Mar. 28, 2008, 11 Pages.

"Using a Force Touch trackpad", Retrieved on: Nov. 17, 2015 Available at: https://support.apple.com/en-in/HT204352, 3 pages.

"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.

"Visus Photonics—Visionary Technologies New Generation of Production Ready Keyboard-Keypad Illumination Systems", Available at: <http://www.visusphotonics.com/pdf/appl_keypad_keyboard_backlights.pdf>, May 2006, pp. 1-22.

"What is Active Alignment?", http://www.kasalis.com/active_alignment.html, retrieved on Nov. 22, 2012, Nov. 22, 2012, 2 Pages.

"Write & Learn Spellboard Advanced", Available at <http://somemanuals.com/VTECH,WRITE%2526LEARN--SPELLBOARD--ADV--71000,JIDFHE.PDF>, 2006, 22 pages.

"Writer 1 for iPad 1 keyboard + Case (Aluminum Bluetooth Keyboard, Quick Eject and Easy Angle Function!)", Retrieved from <https://web.archive.org/web/20120817053825/http://www.amazon.com/keyboard-Aluminum-Bluetooth-Keyboard-Function/dp/B004OQLSLG> on Jan. 23, 2015, Aug. 17, 2012, 5 pages.

Akamatsu,"Movement Characteristics Using a Mouse with Tactile and Force Feedback", In Proceedings of International Journal of Human-Computer Studies 45, No. 4, Oct. 1996, 11 pages.

Bathiche,"Input Device with Interchangeable Surface", U.S. Appl. No. 13/974,749, filed Aug. 23, 2013, 51 pages.

Betters,"What is Force Touch? Apple's Haptic Feedback Technology Explained", Available at: http://www.pocket-lint.com/news/133176-what-is-force-touch-apple-s-haptic-feedback-technology-explained, Mar. 11, 2015, 8 pages.

Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.

Boulanger,"Method and System for Controlling of an Ambient Multiple Zones Haptic Feedback on Mobile Devices (W231)", U.S. Appl. No. 14/298,658, filed Jun. 6, 2014, 34 pages.

Brown,"Microsoft Shows Off Pressure-Sensitive Keyboard", retrieved from <http://news.cnet.com/8301-17938_105-10304792-1.html> on May 7, 2012, Aug. 6, 2009, 2 pages.

Butler,"SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.

Chu,"Design and Analysis of a Piezoelectric Material Based Touch Screen With Additional Pressure and Its Acceleration Measurement Functions", In Proceedings of Smart Materials and Structures, vol. 22, Issue 12, Nov. 1, 2013, 2 pages.

Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.

Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.

De"HTML5: Vibration API", Available at: http://code.tutsplus.com/tutorials/html5-vibration-api--mobile-22585, Mar. 10, 2014, 11 pages.

Dietz,"A Practical Pressure Sensitive Computer Keyboard", In Proceedings of UIST 2009, Oct. 2009, 4 pages.

Gaver,"A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012, May 7, 1995, 9 pages.

Glatt,"Channel and Key Pressure (Aftertouch).", Retrieved from: <http://home.roadrunner.com/~jgglatt/tutr/touch.htm> on Jun. 11, 2012, 2012, 2 pages.

Gong,"PrintSense: A Versatile Sensing Technique to Support Multimodal Flexible Surface Interaction", In Proceedings of the SIGCHI Conference on Human Factors in Computing Systems; retrieved from: http://dl.acm.org/citation.cfm?id=2556288.2557173&coll=DL&dl=ACM&CFID=571580473&CFTOKEN=89752233 on Sep. 19, 2014, Apr. 26, 2014, 4 pages.

Hanlon,"ElekTex Smart Fabric Keyboard Goes Wireless", Retrieved from: <http://www.gizmag.com/go/5048/ > on May 7, 2012, Jan. 15, 2006, 5 pages.

Harada,"VoiceDraw: A Hands-Free Voice-Driven Drawing Application for People with Motor Impairments", In Proceedings of Ninth International ACM SIGACCESS Conference on Computers and Accessibility, retrieved from <http://citeseerx.ist.psu.edu/viewdoc/download?doi=10.1.1.113.7211&rep=rep1&type=pdf > on Jun. 1, 2012, Oct. 15, 2007, 8 pages.

Hinckley,"Touch-Sensing Input Devices", In Proceedings of ACM SIGCHI 1999, May 15, 1999, 8 pages.

Hughes,"Apple's haptic touch feedback concept uses actuators, senses force on iPhone, iPad", Retrieved from: http://appleinsider.com/articles/12/03/22/apples_haptic_touch_feedback_concept_uses_actuators_senses_force_on_iphone_ipad, Mar. 22, 2012, 5 pages.

Iwase,"Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: Journal of Microelectromechanical Systems, Dec. 2005, 7 pages.

Kadlecek,"Overview of Current Developments in Haptic APIs", In Proceedings of 15th Central European Seminar on Computer Graphics, May 2, 2011, 8 pages.

Kaufmann,"Hand Posture Recognition Using Real-time Artificial Evolution", EvoApplications'09, retrieved from <http://evelyne.lutton.free.fr/Papers/KaufmannEvolASP2010.pdf> on Jan. 5, 2012, Apr. 3, 2010, 10 pages.

Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.

Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.

Kyung,"TAXEL: Initial Progress Toward Self-Morphing Visio-Haptic Interface", Proceedings: In IEEE World Haptics Conference, Jun. 21, 2011, 6 pages.

Lane,"Media Processing Input Device", U.S. Appl. No. 13/655,065, filed Oct. 18, 2012, 43 pages.

Li,"Characteristic Mode Based Tradeoff Analysis of Antenna-Chassis Interactions for Multiple Antenna Terminals", In IEEE Transactions on Antennas and Propagation, Retrieved from <http://ieeexplore.ieee.org/stamp/stamp.jsp?tp=&arnumber=6060882>, Feb. 2012, 13 pages.

Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.

Mackenzie,"The Tactile Touchpad", In Proceedings of the ACM CHI Human Factors in Computing Systems Conference Available at: <http://citeseerx.ist.psu.edu/viewdoc/download?doi=10.1.1.150.4780&rep=rep1&type=pdf >, Mar. 22, 1997, 2 pages.

Manresa-Yee,"Experiences Using a Hands-Free Interface", In Proceedings of the 10th International ACM SIGACCESS Conference on Computers and Accessibility, retrieved from <http://dmi.uib.es/~cmanresay/Research/%5BMan08%5DAssets08.pdf> on Jun. 1, 2012, Oct. 13, 2008, pp. 261-262.

McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.

McPherson,"TouchKeys: Capacitive Multi-Touch Sensing on a Physical Keyboard", In Proceedings of NIME 2012, May 2012, 4 pages.

Miller,"MOGA gaming controller enhances the Android gaming experience", Retrieved from <http://www.zdnet.com/moga-gaming-

(56) References Cited

OTHER PUBLICATIONS controller-enhances-the-android-gaming-experience-7000007550/> on Nov. 20, 2012, Nov. 18, 2012, 9 pages.
Nakanishi,"Movable Cameras Enhance Social Telepresence in Media Spaces", In Proceedings of the 27th International Conference on Human Factors in Computing Systems, retrieved from <http://smg.ams.eng.osaka-u.ac.jp/~nakanishi/hnp_2009_chi.pdf> on Jun. 1, 2012, Apr. 6, 2009, 10 pages.
Odegard,"My iPad MagPad concept", Retrieved from <http://www.pocketables.com/2011/02/my-ipad-magpad-concept.html> on Oct. 1, 2015, Feb. 26, 2011, 8 pages.
Picciotto,"Piezo-Actuated Virtual Buttons for Touch Surfaces", U.S. Appl. No. 13/769,356, filed Feb. 17, 2013, 31 pages.
Piltch,"ASUS Eee Pad Slider SL101 Review", Retrieved from <http://www.laptopmag.com/review/tablets/asus-eee-pad-slider-sl101.aspx>, Sep. 22, 2011, 5 pages.
Post,"E-Broidery: Design and Fabrication of Textile-Based Computing", IBM Systems Journal, vol. 39, Issue 3 & 4, Jul. 2000, pp. 840-860.
Poupyrev,"Ambient Touch: Designing Tactile Interfaces for Handheld Devices", In Proceedings of the 15th Annual ACM Symposium on User Interface Software and Technology Available at: <http://www.ivanpoupyrev.com/e-library/2002/uist2002_ambientouch.pdf>, Oct. 27, 2002, 10 pages.
Poupyrev,"Tactile Interfaces for Small Touch Screens", In Proceedings of the 16th Annual ACM Symposium on User Interface Softward and Technology, Nov. 2, 2003, 4 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
Qin,"pPen: Enabling Authenticated Pen and Touch Interaction on Tabletop Surfaces", In Proceedings of ITS 2010—Available at <http://www.dfki.de/its2010/papers/pdf/po172.pdf>, Nov. 2010, pp. 283-284.
Reilink,"Endoscopic Camera Control by Head Movements for Thoracic Surgery", In Proceedings of 3rd IEEE RAS & EMBS International Conference of Biomedical Robotics and Biomechatronics, retrieved from <http://doc.utwente.nl/74929/1/biorob_online.pdf> on Jun. 1, 2012, Sep. 26, 2010, pp. 510-515.
Rendl,"Presstures: Exploring Pressure-Sensitive Multi-Touch Gestures on Trackpads", In Proceedings of SIGCHI Conference on Human Factors in Computing Systems, Apr. 26, 2014, pp. 431-434.
Rendl,"PyzoFlex: Printed Piezoelectric Pressure Sensing Foil", In Proceedings of the 25th Annual ACM Symposium on User Interface Software and Technology, Oct. 7, 2012, 10 pages.
Rubin,"Switched On: The Bedeviled Bezel", Retrieved from: http://www.engadget.com/2011/07/17/switched-on-the-bedeviled-bezel/— on Nov. 19, 2015, Jul. 17, 2011, 4 pages.
Shaw,"Input Device Configuration having Capacitive and Pressure Sensors", U.S. Appl. No. 14/033,510, filed Sep. 22, 2013, 55 pages.
Staff,"Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, Nov. 18, 2011, 5 pages.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Sundstedt,"Gazing at Games: Using Eye Tracking to Control Virtual Characters", In ACM SIGGRAPH 2010 Courses, retrieved from <http://www.tobii.com/Global/Analysis/Training/EyeTrackAwards/veronica_sundstedt.pdf> on Jun. 1, 2012, Jul. 28, 2010, 85 pages.
Takamatsu,"Flexible Fabric Keyboard with Conductive Polymer-Coated Fibers", In Proceedings of Sensors 2011, Oct. 28, 2011, 4 pages.
Titus,"Give Sensors a Gentle Touch", http://www.ecnmag.com/articles/2010/01/give-sensors-gentle-touch, Jan. 13, 2010, 6 pages.
Travis,"Collimated Light from a Waveguide for a Display Backlight", Optics Express, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009, Oct. 15, 2009, 6 pages.
Travis,"The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.
Tuite,"Haptic Feedback Chips Make Virtual-Button Applications on Handheld Devices a Snap", Retrieved at: http://electronicdesign.com/analog/haptic-feedback-chips-make-virtual-button-applications-handheld-devices-snap, Sep. 10, 2009, 7 pages.
Valli,"Notes on Natural Interaction", retrieved from <http://www.idemployee.id.tue.nl/g.w.m.rauterberg/lecturenotes/valli-2004.pdf> on Jan. 5, 2012, Sep. 2005, 80 pages.
Valliath,"Design of Hologram for Brightness Enhancement in Color LCDs", Retrieved from <http://www.loreti.it/Download/PDF/LCD/44_05.pdf> on Sep. 17, 2012, May 1998, 5 pages.
Vaucelle,"Scopemate, A Robotic Microscope!", Architectradure, retrieved from <http://architectradure.blogspot.com/2011/10/at-uist-this-monday-scopemate-robotic.html> on Jun. 6, 2012, Oct. 17, 2011, 2 pages.
Williams,"A Fourth Generation of LCD Backlight Technology", Retrieved from <http://cds.linear.com/docs/Application%20Note/an65f.pdf>, Nov. 1995, 124 pages.
Xu,"Hand Gesture Recognition and Virtual Game Control Based on 3D Accelerometer and EMG Sensors", IUI'09, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf> on Jan. 5, 2012, Feb. 8, 2009, 5 pages.
Xu,"Vision-based Detection of Dynamic Gesture", ICTM'09, Dec. 5-6, 2009, retrieved from <http://ieeexplore.ieee.org/stamp/stamp.jsp?tp=&arnumber=5412956> on Jan. 5, 2012, Dec. 5, 2009, pp. 223-226.
Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
Zhu,"Keyboard before Head Tracking Depresses User Success in Remote Camera Control", In Proceedings of 12th IFIP TC 13 International Conference on Human-Computer Interaction, Part II, retrieved from <http://csiro.academia.edu/Departments/CSIRO_ICT_Centre/Papers?page=5> on Jun. 1, 2012, Aug. 24, 2009, 14 pages.
"Foreign Office Action", CN Application No. 201480009165.3, dated Apr. 12, 2017, 16 pages.
"International Preliminary Report on Patentability", Application No. PCT/US2014/016743, dated Sep. 7, 2015, 7 pages.
"International Search Report and Written Opinion", Application No. PCT/US2017/013583, dated Apr. 19, 2017, 15 pages.
"Non-Final Office Action", U.S. Appl. No. 13/782,137, dated May 19, 2017, 27 pages.
"Non-Final Office Action", U.S. Appl. No. 14/729,793, dated Mar. 31, 2017, 14 pages.
"Second Written Opinion", Application No. PCT/US2014/016151, dated Jan. 29, 2015, 6 pages.
"Second Written Opinion", Application No. PCT/US2016/025966, dated Mar. 14, 2017, 7 pages.
"Advisory Action", U.S. Appl. No. 13/769,356, dated Dec. 16, 2016, 3 pages.
"Examiner's Answer to Appeal Brief", U.S. Appl. No. 13/974,994, dated May 18, 2016.
"Final Office Action", U.S. Appl. No. 13/655,065, dated Nov. 17, 2015, 25 pages.
"Final Office Action", U.S. Appl. No. 13/759,875, dated Mar. 27, 2015, 18 pages.
"Final Office Action", U.S. Appl. No. 13/769,356, dated Sep. 30, 2016, 15 pages.

(56) References Cited

OTHER PUBLICATIONS

"Final Office Action", U.S. Appl. No. 13/782,137, dated Dec. 29, 2016, 24 pages.
"Final Office Action", U.S. Appl. No. 14/033,510, dated Feb. 8, 2016, 27 pages.
"Final Office Action", U.S. Appl. No. 14/591,704, dated Nov. 25, 2016, 33 pages.
"Final Office Action", U.S. Appl. No. 14/729,793, dated Dec. 1, 2017, 17 pages.
"International Preliminary Report on Patentability", Application No. PCT/US2016/025966, dated May 22, 2017, 8 pages.
"International Search Report and Written Opinion", Application No. PCT/US2016/028191, dated Jun. 29, 2016, 14 pages.
"International Search Report and Written Opinion", Application No. PCT/US2016/031699, dated Nov. 11, 2016, 23 pages.
"Non-Final Office Action", U.S. Appl. No. 13/975,087, dated May 10, 2016, 18 pages.
"Non-Final Office Action", U.S. Appl. No. 14/033,510, dated Oct. 7, 2015, 23 pages.
"Non-Final Office Action", U.S. Appl. No. 15/004,423, dated Jun. 29, 2017, 16 pages.
"Non-Final Office Action", U.S. Appl. No. 15/269,594, dated Jun. 7, 2017, 27 pages.
"Notice of Allowance", U.S. Appl. No. 14/591,704, dated Aug. 21, 2017, 15 pages.
"Notice of Allowance", U.S. Appl. No. 14/698,318, dated May 6, 2016, 13 pages.
"Notice of Allowance", U.S. Appl. No. 15/283,913, dated Sep. 6, 2017, 9 pages.
"Second Written Opinion", Application No. PCT/US2015/067754, dated Nov. 25, 2016, 8 pages.
"Notice of Allowance", U.S. Appl. No. 15/283,913, dated Mar. 19, 2018, 10 pages.
"Notice of Allowance", U.S. Appl. No. 15/004,423, dated Jan. 9, 2018, 15 pages.
"Advisory Action", U.S. Appl. No. 14/729,793, dated Feb. 13, 2018, 2 pages.
"Advisory Action", U.S. Appl. No. 13/769,356, dated May 30, 2017, 2 pages.
"Non Final Office Action Issued in U.S. Appl. No. 13/769,356", dated May 19, 2017, 27 Pages.
"Non Final Office Action Issued in U.S. Appl. No. 13/974,749", dated Jan. 20, 2017, 23 Pages.
"Final Office Action Issued in U.S. Appl. No. 13/975,087", dated Nov. 4, 2016, 23 Pages.
"Office Action Issued in European Patent Application No. 14819214.9", dated Mar. 2, 2018, 5 Pages.
"Third Office Action Issued in Chinese Patent Application No. 2014800091653", dated Jun. 4, 2018, 19 Pages.
"Office Action Issued in Chinese Patent Application No. 201480071909.4", dated Feb. 27, 2018, 13 Pages.
"Final Office Action Issued in U.S. Appl. No. 14/033,510", dated Sep. 22, 2016, 22 Pages.
"First Office Action Issued in Chinese Patent Application No. 201210085821.0", dated May 5, 2016, 18 Pages.
"Office Action Issued in Chinese Patent Application No. 201480009165.3", dated Nov. 2, 2018, 12 Pages.
"Written Opinion Issued in PCT Application No. PCT/US2017/013583", dated Aug. 2, 2018, 7 Pages.

* cited by examiner

INPUT DEVICE HAPTICS AND PRESSURE SENSING

This application is a continuation of and claims priority to U.S. application Ser. No. 14/698,318 entitled "Input Device Haptic and Pressure Sensing" and filed Apr. 28, 2015, which in turn claims priority as a continuation-in-part to U.S. patent application Ser. No. 14/144,876, filed Dec. 31, 2013, and titled "Haptic Feedback for Thin User Interfaces," the entire disclosures of which are hereby incorporated by reference herein.

BACKGROUND

Trackpads may be found on a variety of different devices to support cursor control, such as on a laptop, removable keyboard cover for a tablet, and so on. In some instances, the trackpads also include functionality usable to initiate a selection (e.g., a "click") and thus movement of a cursor and selections may be made by a user without requiring a user to remove a finger from the trackpad to press a separate button.

Conventional techniques used to implement this functionality typically involved a hinged structure and a dome switch. Since these implementations are typically hinged from the top, the response is not uniform and the upper region of the trackpad is difficult to "click." These conventional trackpads also struggle to reject inadvertent actuations when a user is typing, thereby causing a cursor to jump around in a random manner and thus interfere with a user's interaction with a computing device, which is both inefficient and frustrating.

SUMMARY

Input device haptics and pressure sensing techniques are described. In one or more examples, an input device includes an outer surface, a pressure sensor and haptic feedback mechanism, and a pressure sensing and haptic feedback module. The outer surface is configured to receive an application of pressure by an object. The pressure sensor and haptic feedback mechanism has one or more piezos configured to detect and quantify an amount of the application of the pressure to the outer surface by the object, the one or more piezos configured to output a signal indicating the quantified amount of the pressure. The pressure sensing and haptic feedback module is configured to receive the signal from the one or more piezos indicating the quantified amount of the pressure and control the haptic feedback of the pressure sensor and haptic feedback mechanism by energizing the one or more piezos based at least in part of the quantified amount of pressure.

In one or more examples, a trackpad system includes an outer surface configured to receive an application of pressure by an object and detect movement of the object in relation to the outer surface, the detected movement usable to control a cursor of a computing device; a pressure sensor and haptic feedback mechanism having a plurality of piezos that suspend the outer surface and are configured to detect and quantify an amount of the application of the pressure to the outer surface by the object, the pressure sensor and haptic feedback mechanism configured to output one or more signals indicating the quantified amount of the pressure; and a pressure sensing module configured to receive the one or more signals from the pressure sensors indicating the quantified amount of the pressure by the one or more piezos and control the haptic feedback of the haptic feedback mechanism by energizing the one or more piezos based at least in part of the quantified amount of pressure.

In one or more examples, an input device includes an outer surface configured to receive an application of pressure by an object, a pressure sensor configured to detect and quantify an amount of the application of the pressure to the outer surface by the object, the pressure sensor configured to output a signal indicating the quantified amount of the pressure, a haptic feedback mechanism configured to provide haptic feedback using at least one piezo, and a pressure sensing module configured to receive the signal from the pressure sensors indicating the quantified amount of the pressure and control the haptic feedback of the haptic feedback mechanism by energizing the at least one piezo based at least in part of the quantified amount of pressure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques used to support tactile feedback when "clicking" a trackpad suffered from inadvertent actuations, lack of uniformity in the response, and so forth. Consequently, these conventional techniques could interfere with a user's experience when interacting with the trackpad to input data using the trackpad itself and even a keyboard associated with the trackpad.

Input device haptics and pressure sensing techniques are described. In one or more implementations, an input device such as a trackpad, key of a keyboard, and so forth is configured to support haptics and/or pressure sensing. For example, piezos may be arranged at the corners of a trackpad and as such suspend the trackpad. When a pressure is detected (e.g., a user pressing a surface of the trackpad with a finger), the piezos are energized to provide haptic feedback that may be felt by the user.

Additionally, the piezos may also be utilized to detect the pressure itself, such as to monitor an output voltage of the piezos generated due to strain caused by the pressure to the piezos. In this way, inadvertent clicks may be avoided with a uniform response over an entirety of a surface of the trackpad. A variety of other examples are also contemplated, such as to address voltage decay, bipolar voltages, and so on as described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures as further described below.

Example Environment

Figure 1:
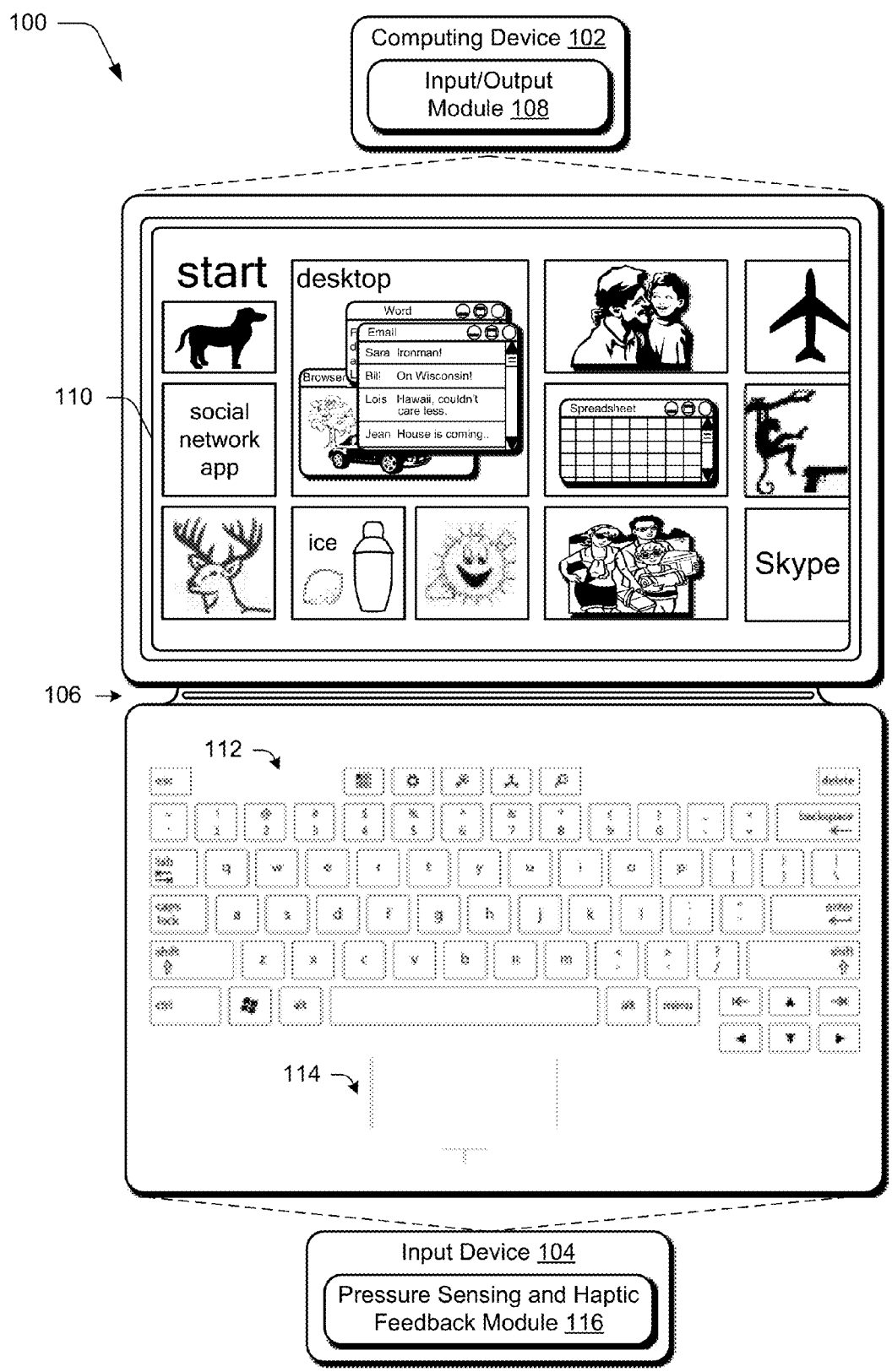
FIG. 1 is an illustration of an environment in an example implementation that is operable that is operable to employ the input device haptics and pressure sensing techniques described herein.

FIG. 1 is an illustration of an environment 100 in an example implementation that is operable to employ the input device haptics and pressure sensing techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard 112 having a QWERTY arrangement of keys and track pad 114 although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

The flexible hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, perform authentication, provide supplemental power to the computing device 102, and so on. The flexible hinge 106 may be configured in a variety of ways, further discussion of which may be found in relation to FIG. 2.

The input device is also illustrated as including a pressure sensing and haptic feedback module 116 that is representative of functionality to detect pressure and supply haptic feedback in response to the detected pressure. A user, for instance, may press the trackpad with a finger and in response receive haptic feedback. This may be performed in a variety of ways, an example of which is described in the following and shown in a corresponding figure.

Figure 2:
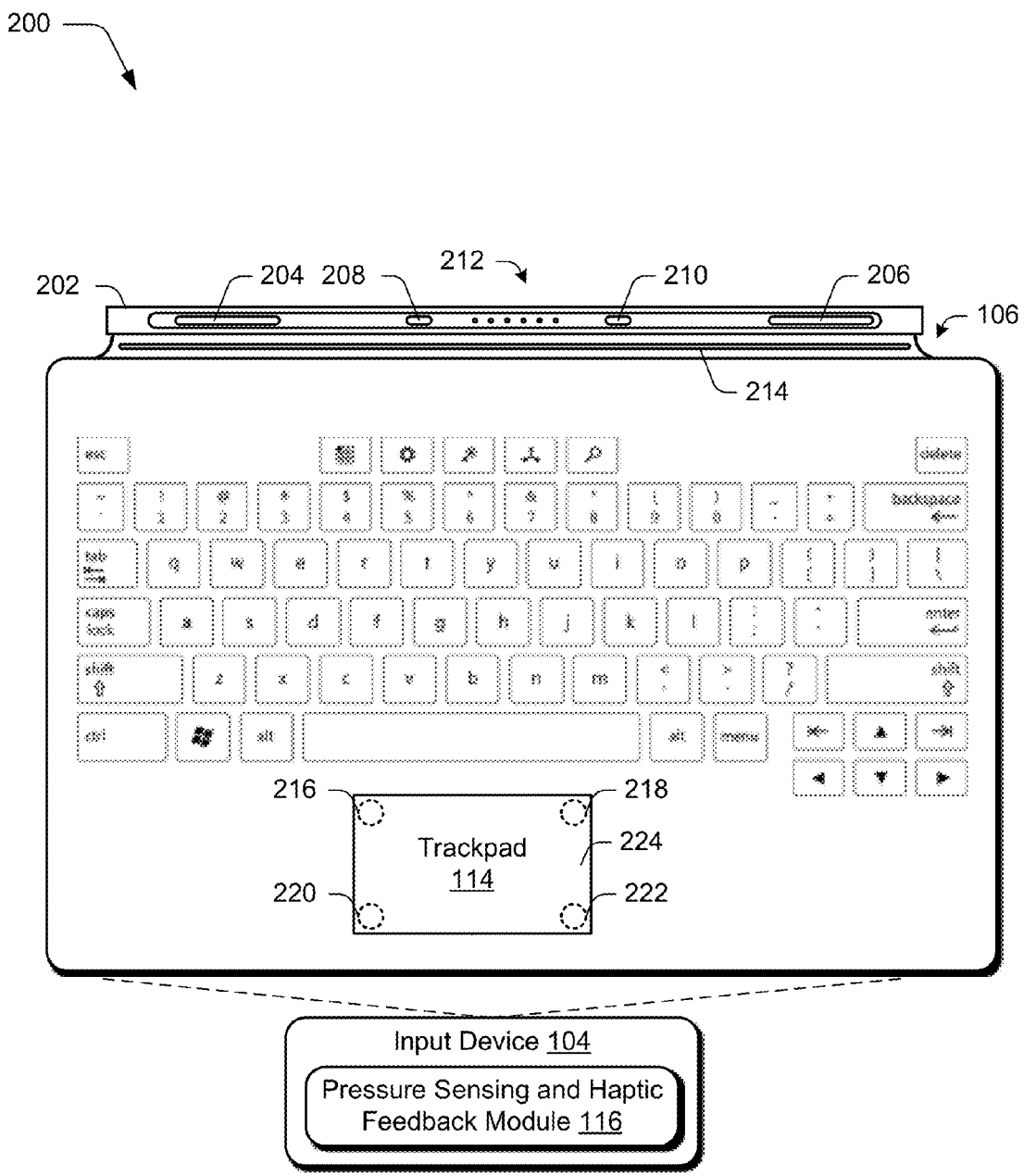
FIG. 2 depicts an example implementation of an input device of FIG. 1 as showing a flexible hinge and trackpad in greater detail.

FIG. 2 depicts an example implementation 200 of the input device 104 of FIG. 1 as showing the flexible hinge 106 and trackpad 114 in greater detail. In this example, a connection portion 202 of the input device is shown that is configured to provide a communicative and physical connection between the input device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the input device 104 that includes the keys through use of the flexible hinge 106. Thus, when the connection portion 202 is physically connected to the computing device the combination of the connection portion 202 and the flexible hinge 106 supports movement of the input device 104 in relation to the computing device 102 that is similar to a hinge of a book. Through this rotational movement, a variety of different orientations of the input device 104 in relation to the computing device 102 may be supported, such as to act to cover the display device 110 of FIG. 1, be disposed behind the housing of the computing device 102, and so forth.

The connection portion 202 is illustrated in this example as including magnetic coupling devices 204, 206, mechanical coupling protrusions 208, 210, and a plurality of communication contacts 212. Although physical contacts 212 are shown in this example, wireless communication techniques are also contemplated, e.g., NFC, Bluetooth®, and so forth. The magnetic coupling devices 204, 206 are configured to magnetically couple to complementary magnetic coupling devices of the computing device 102 through use of one or more magnets. In this way, the input device 104 may be physically secured to the computing device 102 through use of magnetic attraction.

The connection portion 202 also includes mechanical coupling protrusions 208, 210 to form a mechanical physical connection between the input device 104 and the computing device 102. The mechanical coupling protrusions 208, 210 are configured to permit removal of the input device 104 along a plane following a height of the protrusions and restrict removal through mechanical binding along other planes. A mid-spine 214 is also included to support mechanical stiffness and a minimum bend radius of the flexible hinge 106.

The input device 104 also includes a keyboard 112 and trackpad 114 as previously described. Although the pressure sensing and haptic feedback techniques are described in relation to the trackpad 114 in the following, these techniques are equally applicable to keys of the keyboard 112.

The trackpad 114 in the illustrated example is formed as a rectangle having four corners, although other shapes are also contemplated. Pressure sensor and haptic feedback mechanisms 216, 218, 220, 222 are disposed at respective corners to suspend an outer surface 224 of the trackpad 114. The pressure sensor and haptic feedback mechanisms 216-222 are configured to provide haptic feedback based at least in part on sensed amounts of pressure. As such, the pressure sensor and haptic feedback mechanisms 216-222 may be configured in a variety of ways, an example of which is described in the following and shown in a corresponding figure.

Figure 3:
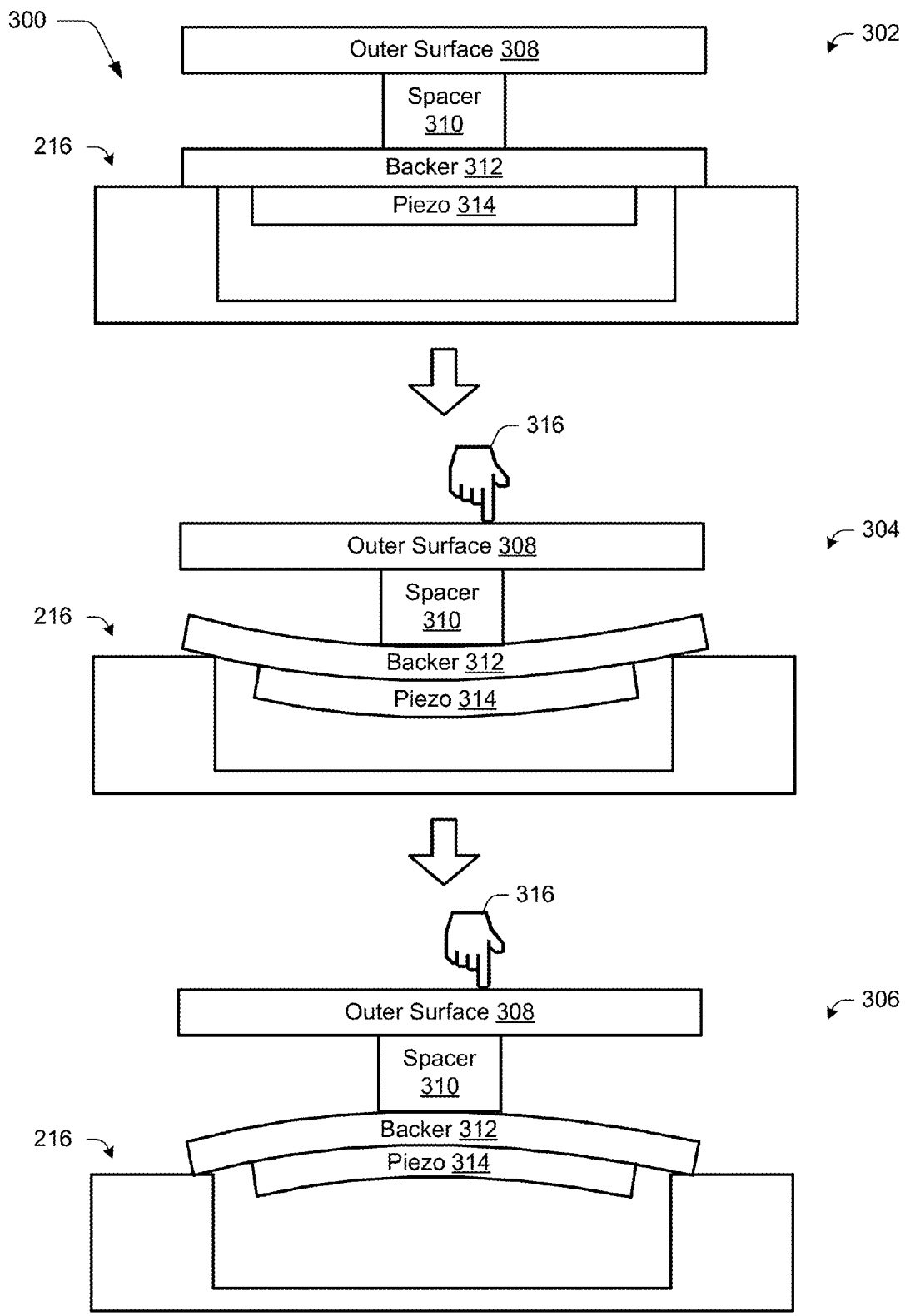
FIG. 3 depicts an example of a pressure sensor and haptic feedback mechanism of FIG. 2 as employing piezos to detect pressure and/or provide haptic feedback.

FIG. 3 depicts an example 300 of a pressure sensor and haptic feedback mechanism 216 of FIG. 2 as employing piezos to detect pressure and/or provide haptic feedback. This example is illustrated using first, second, and third stages 302, 304, 306. The pressure sensor and haptic feedback mechanism 216 includes an outer surface 308, such as an outer surface 308 of the trackpad, a key of a keyboard, and so forth. The outer surface 308 may be formed from a variety of different materials and combinations thereof, such as a glass, plastic, a laminate structure, include a fabric outer layer, and so forth.

The outer surface 308 is coupled mechanically to a spacer 310 that is coupled mechanically to a backer 312. The spacer 310 is configured to channel pressure applied to the outer surface 310 to a central region of the backer 312 and thus a piezo 314 connected thereto. In this way, an amount of deflection of the backer 312 and corresponding piezo 314 is increased in response to the pressure even on "off center" presses, thereby supporting a greater sensitivity to detection of an amount of pressure and haptic response.

The backer 312 is formed from a rigid material (e.g., steel, plastic, and the like) and physically coupled to the piezo 314. Accordingly, when a pressure is not applied to the outer surface 308 (and thus no pressure is applied to the backer 312) the piezo 314 is not strained and as such does not output a voltage as shown at the first stage 302. At the second stage 304, an object 316 such as a finger of a user's hand (not shown in scale) as part of pressing down on the outer surface 316 applies a pressure that causes deflection of the backer 312 and thus strain on the piezo 314 which results in an output voltage which is detectable by the pressure sensing and haptic feedback module 116.

As the voltage output by the piezo 314 changes with an amount of pressure applied, the piezo 314 is configured to detect not just presence or absence or pressure, but also an amount of pressure, e.g., a respective one of a plurality of levels of pressure. The piezo 314 is configurable in a variety of ways, such as formed at least in part from a piezo ceramic material, PZT, electroactive polymer, or electromechanical polymer. Other techniques to detect pressure are also contemplated, such as FSRs, changing in capacitance, changes in detect contact size, strain gauges, piezo-resistive elements, and so on.

The piezo 314 is also usable to provide a haptic feedback as shown at the third stage 306. Continuing with the previous example in the second stage 304, the piezo 314 detects an amount of pressure applied to the outer surface 308 by the finger of the user's hand. If the detected pressure is over a threshold, the pressure sensing and haptic feedback module 116 energizes the piezo 314. This causes the piezo 314 to pull against the backer 312 and thus deflect outward back toward an object 316 applying the pressure, thereby providing a haptic response.

In this way, the piezo 314 is leveraged to provide both pressure sensing and haptic feedback. Other examples are also contemplated. For instance, pressure may be sensed by a pressure sensor that is not the piezo and then the piezo may be used to provide haptic feedback. In another instance, a first piezo may be used to detect pressure and another piezo may be used to provide haptic feedback.

Figure 4:
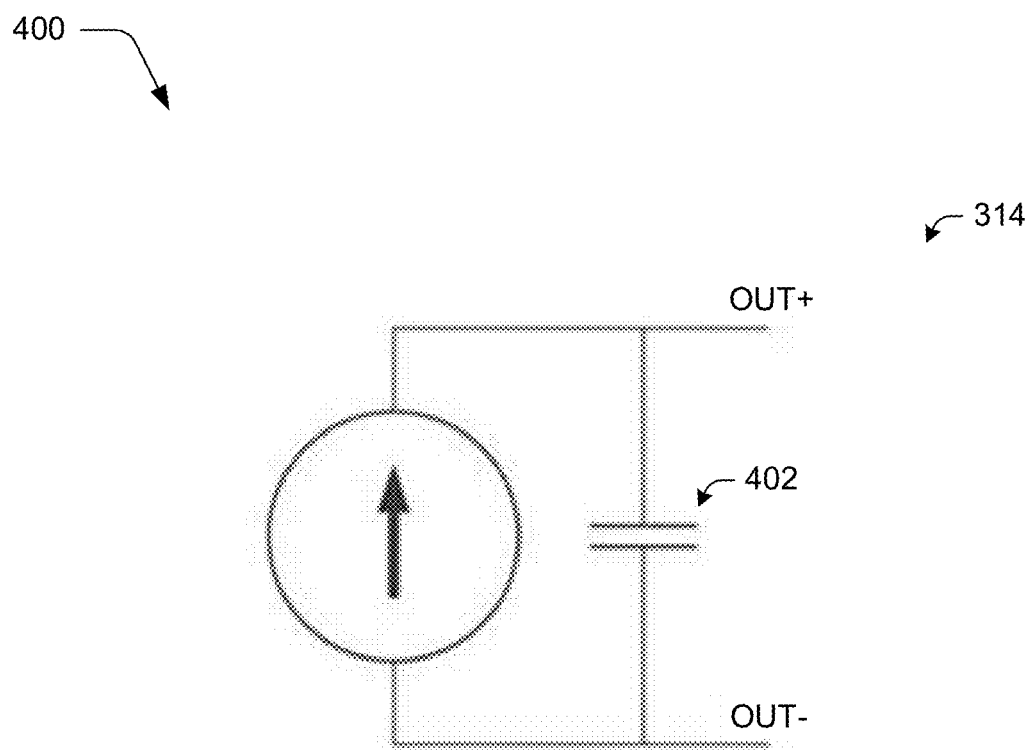
FIG. 4 depicts an example circuit model of a piezo of FIG. 3.

FIG. 4 depicts an example circuit model 400 of the piezo 314 of FIG. 3. When the piezo 314 deflects as shown in the second stage 304 of FIG. 3, a current is generated, which then charges its intrinsic capacitance as well as any externally applied capacitance. The voltage across the capacitor 402 can then be read by the pressure sensing and haptic feedback module 116 as an indication of deflection, and thus applied pressure.

Figure 5:
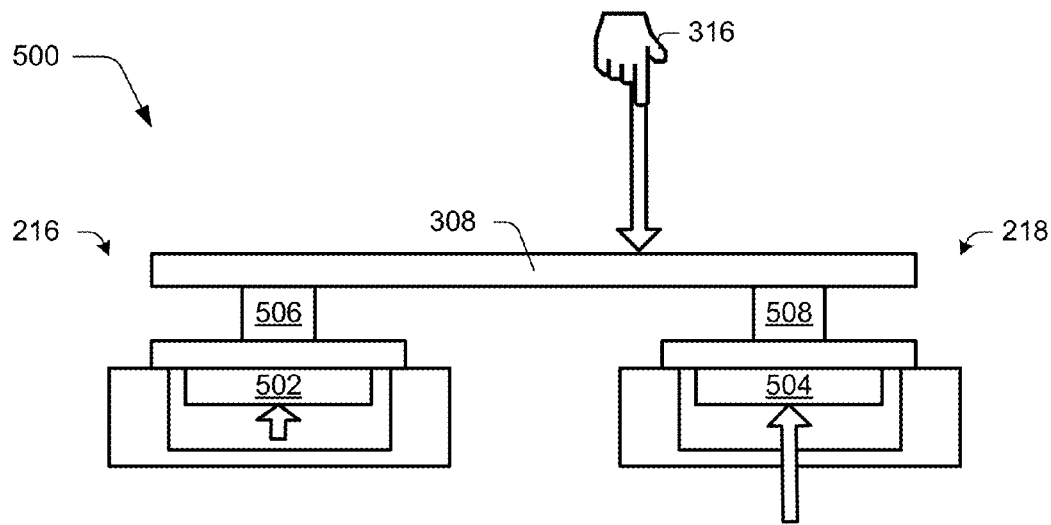
FIG. 5 depicts a cross section view of pressure sensor and haptic feedback mechanisms of FIG. 2.

FIG. 5 depicts a cross section view 500 of pressure sensor and haptic feedback mechanisms 216, 218 of FIG. 2. When there are multiple pressure sensor and haptic feedback mechanisms 216-222 as shown in FIG. 2, measures of signals generated by the mechanisms may be taken in a variety of different ways. For example, each of the mechanisms may be measured individually, which may be used to calculate a location (e.g., centroid) of an object that applies the pressure in relation to the outer surface 308, e.g., through triangulation.

In another example, the signal is derived by summing signals from all of the pressure sensor and haptic feedback mechanisms 216-222, i.e., the piezos of these mechanisms. As shown in FIG. 5, for instance, an object 216 applies pressure that is detected by respective piezos 502, 504 of respective pressure sensor and haptic feedback mechanisms 216, 218. The pressure is applied by the object 316 in this example between spacers 506, 508 of the mechanisms. Arrows are utilized to indicate application of the pressure by the object 316 and respective amounts of the pressure sensed by the piezos 502, 504. As illustrated, the piezo 504 closest to a location at which the pressure is applied receives a larger amount of the pressure than the piezo 502 that is located further away. By summing the responses of the piezos in this example, the amount of pressure applied by the object 316 is detected.

Figure 6:
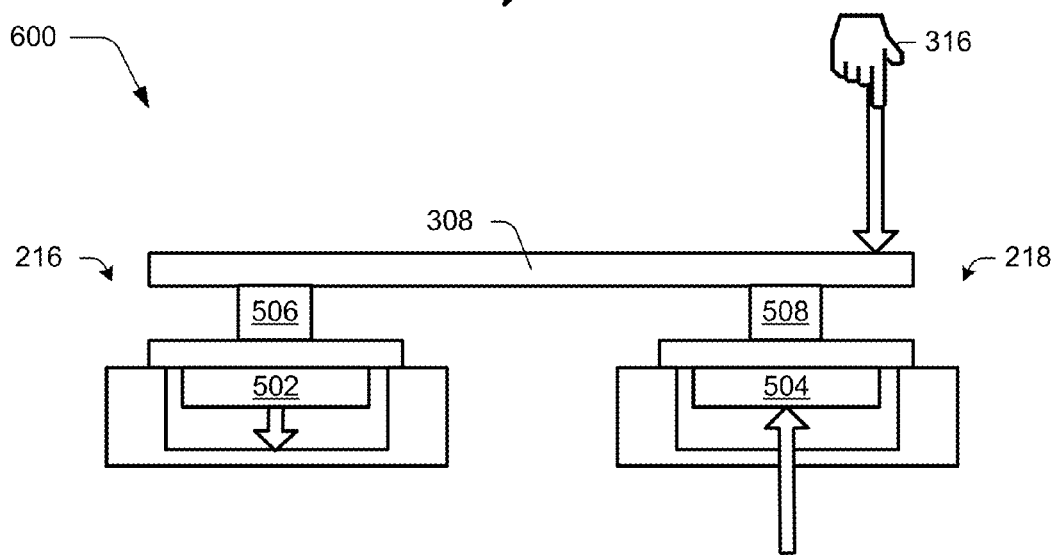
FIG. 6 depicts a cross section view of pressure sensor and haptic feedback mechanisms of FIG. 2 as involving negative voltages.

FIG. 6 depicts a cross section view 600 of pressure sensor and haptic feedback mechanisms 216, 218 of FIG. 2 as involving negative voltages. In this example, the object 316 applies pressure to an area of the outer surface 308 that is not positioned between the spacers 506, 508 of the pressure sensor and haptic feedback mechanisms 216, 218. This causes the piezo 502 to "lift up" and exhibit a negative voltage while the piezo 504 measures a positive voltage. In this example, the voltages from the piezos 502, 504 are still summed to detect the amount of pressure applied by the object 316 as the amount of pressure detected by the piezo 504 more than compensates for the negative amount of pressure detected by the piezo 502.

Returning again to FIG. 4, techniques are employed to reduce an effect of charge leakage. Once charged, the capacitor 402 slowly leaks away charge. Accordingly, if a user wants to perform a "push and hold" gesture, the voltage may slowly drain away to the point where the system could believe that a user has lifted their finger away from the outer surface, even though the finger is applying a relatively constant amount of pressure. By periodically discharging the capacitor 402 and storing pressure offsets (e.g., by the pressure sensing and haptic feedback module 116), this issue of decay can be avoided.

For example, when a piezo is unmoving, current does not flow and the voltage is held. At any time, the capacitor 402 of the circuit 400 can be discharged by an external circuit, e.g., by the pressure sensing and haptic feedback module 116. Any additional deflection, whether positive or negative, for the piezo will then charge the capacitor from its discharged state.

One example of such a sequence is for a finger to apply a pressure to a piezo and hold, causing the piezo to generate a signal of "X" volts, which is stored as an off-set. The capacitor 402 is then discharged by an external circuit (e.g., pressure sensing and haptic feedback module 116) such that the piezo voltage is now "0." Accordingly, the piezo voltage is now zero volts, but the "X" offset is remembered and stored in "Y" such that pressure now equals a currently read voltage plus a value stored in "Y." Therefore, if the finger ceases application of pressure (i.e., releases the piezo) and the piezo relaxes to a rest deflection, the piezo voltage is now "–X" volts. With the stored away offset, however, the pressure is read as zero by the pressure sensing and haptic feedback module 116. The capacitor 402 is discharged again and zero is stored as the new offset.

In one or more implementations, discharge of the capacitor 402 is managed to occur when above a threshold voltage and when pressure has been relatively constant for a defined amount of time. In this way, risk of injecting noise into the pressure signal is minimized.

In order to provide haptic feedback as previously described, the pressure sensing and haptic feedback module 116 energizes the piezos, e.g., through application of +/– one hundred volts. However, after the piezos are energized the amount of voltage remaining in the piezos is random. Accordingly, in order to continue to use the piezos for pressure sensing after a haptic event, an amount of pressure is detected and stored in an offset that includes a sum of a piezo voltage "X" and accumulated offsets "Y" as described above.

The haptic event is performed by energizing the piezos by the pressure sensing and haptic feedback module 116. The piezos are cleared and a waiting period is undertaken for an amount of time in order to settle voltages of the piezos. The voltage is then read, and the offset "Y" is set such that a read-back pressure matches a pressure before the haptic event. Accordingly, in this example an assumption is made that the pressure going into a haptic event matches the pressure coming out of the haptic event such that after the haptic event the pressure is recalibrated to match the previous pressure before the event.

To keep the system calibrated, the pressure sensing and haptic feedback module 116 may zero the piezos by defining a read-back voltage as zero pressure, which optionally involves clearing the piezos when it is sensed that the pressure is removed, e.g., the object is lifted from the outer surface. This lifting may be detected using sensors (e.g., capacitive sensors) of the trackpad that are used to detect movement and location.

Figure 7:
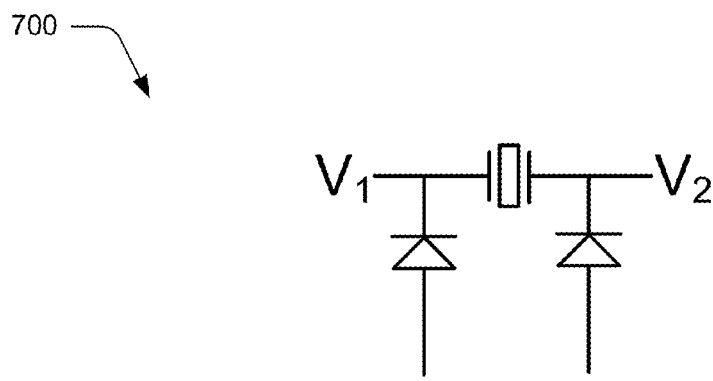
FIG. 7 depicts a circuit in an example implementation that is configured to read bipolar voltages.

FIG. 7 depicts a circuit 700 in an example implementation that is configured to read bipolar voltages. As described in relation to FIG. 6 above, in some instances positive and negative voltages may be detected by the pressure sensor and haptic feedback mechanisms 216, 218. In order to establish a zero point as actually occurring at a zero voltage, the voltage is measure differentially using diodes as shown in the circuit 700 of FIG. 7. An ADC may be connected to either terminal, which may be represented as capacitors to ground.

Figure 8:
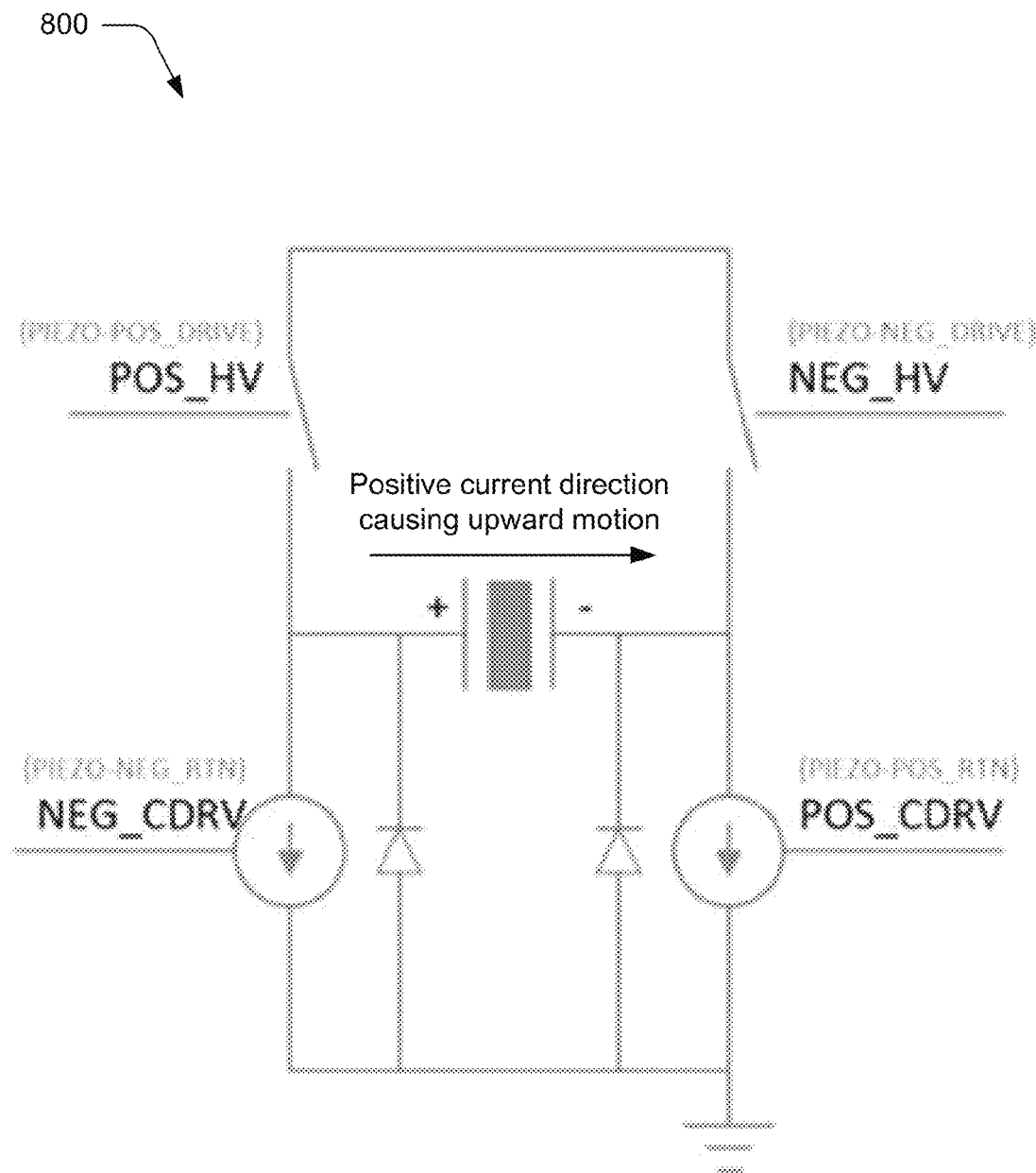
FIG. 8 depicts an example implementation of a circuit usable to energize piezos using a bridge circuit.
Figure 9:
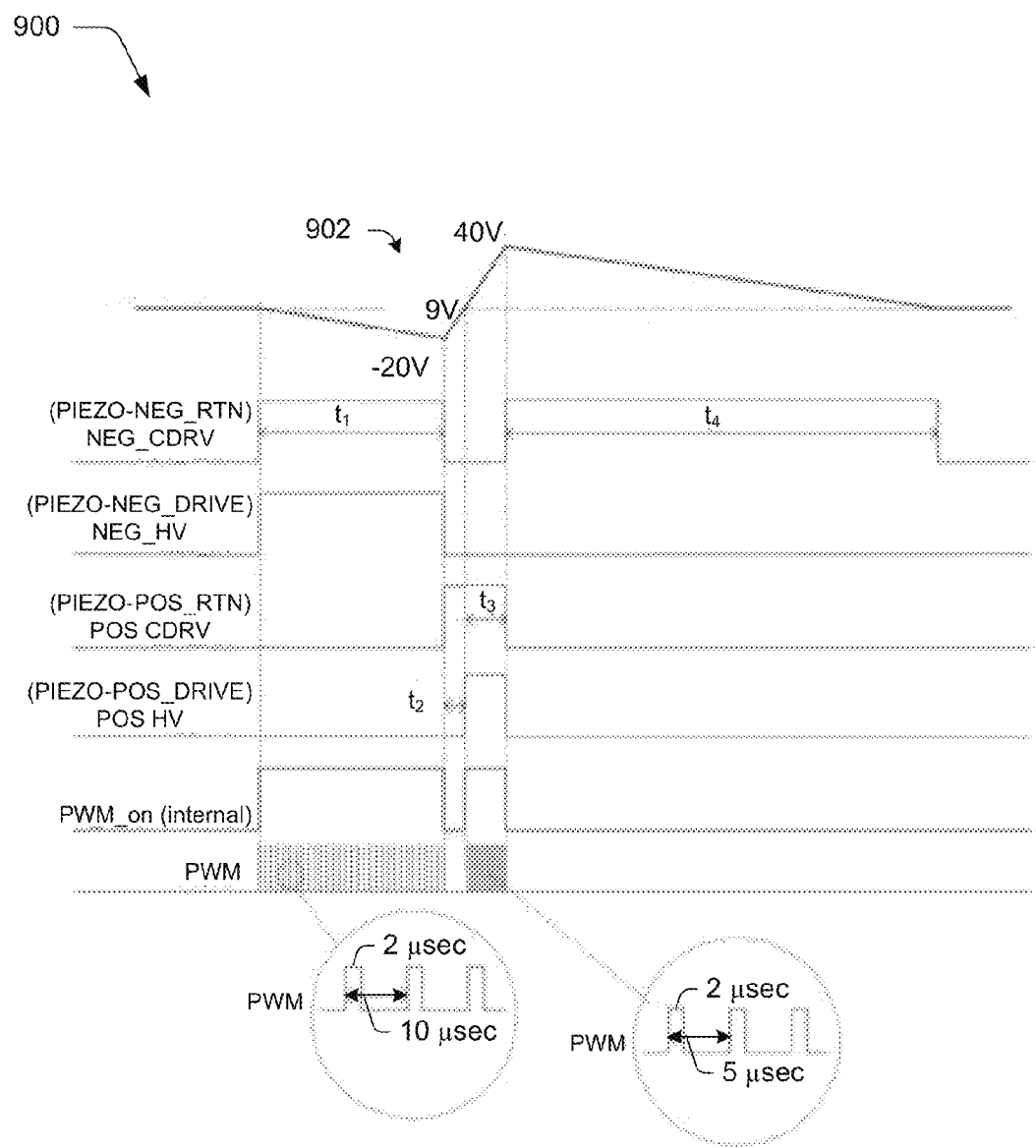
FIG. 9 depicts an example of a waveform used to drive the circuit shown in FIG. 9.

FIG. 8 depicts an example implementation of a circuit 800 usable to energize piezos using a bridge circuit. An example of a waveform 900 used to drive the circuit 800 is shown in FIG. 9. The haptic response (i.e., the "click sensation") occurs at a rapid ramp up 902 portion of the waveform 900 at times "t2" and "t3." In this way, piezos may be used to detect applied pressure and provide haptic feedback, further discussion of which is included in the following procedure.

Example Procedures

The following discussion describes haptic and pressure sensing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-9 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 10:
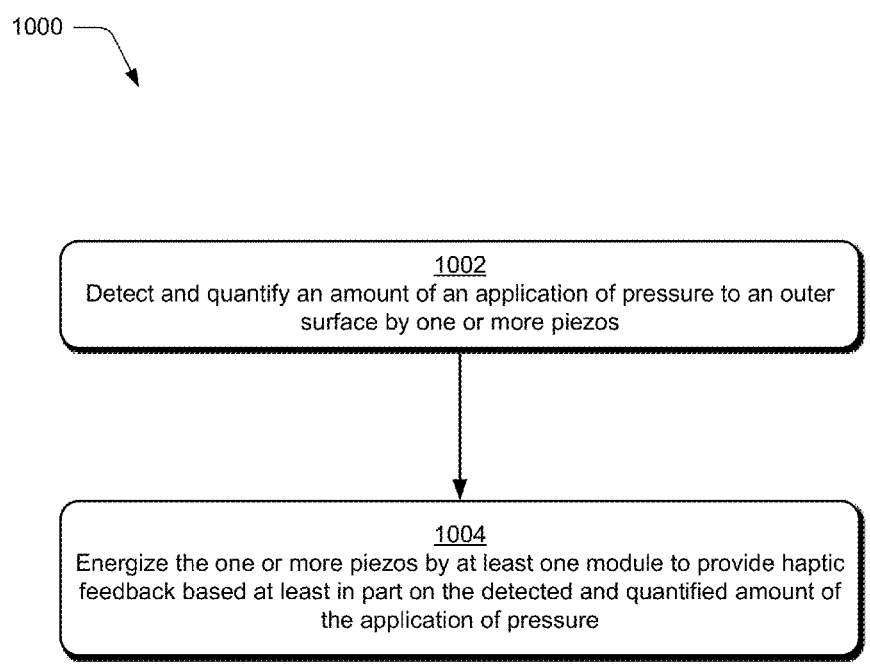
FIG. 10 is a flow diagram depicting a procedure in an example implementation in which piezos are used to detect pressure and provide haptic feedback.

FIG. 10 depicts a procedure 1000 in an example implementation in which piezos are used to detect pressure and provide haptic feedback. An amount of an application of pressure to an outer surface is detected and quantified by one or more piezos (block 1002). The one or more piezos are energized by at least one module to provide haptic feedback based at least in part on the detected and quantified amount of the application of pressure (block 1004). A variety of other examples are also contemplated.

Example System and Device

Figure 11:
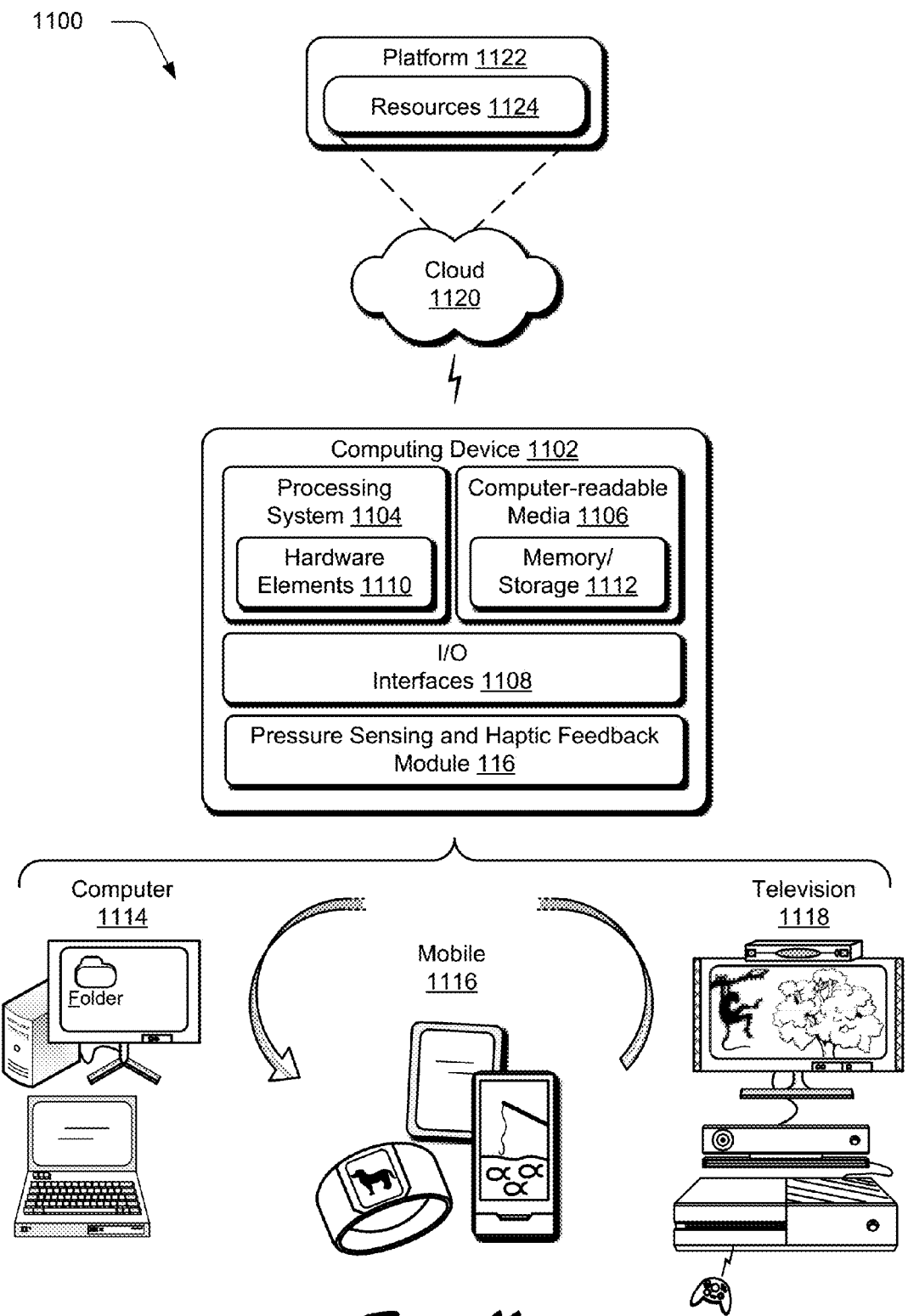
FIG. 11 illustrates an example system including various components of an example device that can be implemented as any type of computing device as described with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the pressure sensing and haptic feedback module 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1114, mobile 1116, and television 1118 uses. Each of these configurations includes devices that may have generally different constructs and capabilities, and thus the computing device 1102 may be configured according to one or more of the different device classes. For instance, the computing device 1102 may be implemented as the computer 1114 class of a device that includes a personal computer, desktop computer, a multi-screen computer, laptop computer, netbook, and so on.

The computing device 1102 may also be implemented as the mobile 1116 class of device that includes mobile devices, such as a mobile phone, wearables (e.g., wrist bands, pendants, rings, etc.) portable music player, portable gaming device, a tablet computer, a multi-screen computer, and so on. The computing device 1102 may also be implemented as the television 1118 class of device that includes devices having or connected to generally larger screens in casual viewing environments. These devices include televisions, set-top boxes, gaming consoles, and so on. Other devices are also contemplated, such as appliances, thermostats and so on as part of the "Internet of Things."

The techniques described herein may be supported by these various configurations of the computing device 1102 and are not limited to the specific examples of the techniques described herein. This functionality may also be implemented all or in part through use of a distributed system, such as over a "cloud" 1120 via a platform 1122 as described below.

The cloud 1120 includes and/or is representative of a platform 1122 for resources 1124. The platform 1122 abstracts underlying functionality of hardware (e.g., servers) and software resources of the cloud 1120. The resources 1124 may include applications and/or data that can be utilized while computer processing is executed on servers that are remote from the computing device 1102. Resources 1124 can also include services provided over the Internet and/or through a subscriber network, such as a cellular or Wi-Fi network.

The platform 1122 may abstract resources and functions to connect the computing device 1102 with other computing devices. The platform 1122 may also serve to abstract scaling of resources to provide a corresponding level of scale to encountered demand for the resources 1124 that are implemented via the platform 1122. Accordingly, in an interconnected device embodiment, implementation of functionality described herein may be distributed throughout the system 1100. For example, the functionality may be implemented in part on the computing device 1102 as well as via the platform 1122 that abstracts the functionality of the cloud 1120.

Conclusion and Example Implementations

Example implementations described herein include, but are not limited to, one or any combinations of one or more of the following examples:

In one or more examples, an input device includes an outer surface, a pressure sensor and haptic feedback mechanism, and a pressure sensing and haptic feedback module. The outer surface is configured to receive an application of pressure by an object. The pressure sensor and haptic feedback mechanism has one or more piezos configured to detect and quantify an amount of the application of the pressure to the outer surface by the object, the one or more piezos configured to output a signal indicating the quantified amount of the pressure. The pressure sensing and haptic feedback module is configured to receive the signal from the one or more piezos indicating the quantified amount of the pressure and control the haptic feedback of the pressure sensor and haptic feedback mechanism by energizing the one or more piezos based at least in part of the quantified amount of pressure.

An example as described alone or in combination with any of the other examples described above or below, wherein the pressure sensor and haptic feedback mechanism includes a backer that deflects in response to a pulling motion of the one or more piezos due to the energizing of the one or more piezos.

An example as described alone or in combination with any of the other examples described above or below, further comprising a spacer configured to route the amount of pressure applied to the outer surface for application at a generally central region of the backer.

An example as described alone or in combination with any of the other examples described above or below, wherein the outer surface is formed as part of a trackpad that includes one or more sensors disposed thereon that are configured to detect proximity and movement of the object in relation to the outer surface.

An example as described alone or in combination with any of the other examples described above or below, wherein the one or more piezos are formed at least in part from a piezo ceramic material, PZT, electroactive polymer, or electromechanical polymer.

An example as described alone or in combination with any of the other examples described above or below, wherein the pressure sensing module includes a capacitor that takes as an input the signal from the one or more piezos, the capacitor is configured to be reset to address voltage decay of the signal using a stored voltage offset by the pressure sensing and haptic feedback module.

In one or more examples, a trackpad system includes an outer surface configured to receive an application of pressure by an object and detect movement of the object in relation to the outer surface, the detected movement usable to control a cursor of a computing device; a pressure sensor and haptic feedback mechanism having a plurality of pressure sensors that suspend the outer surface and are configured to detect and quantify an amount of the application of the pressure to the outer surface by the object, the pressure sensor and haptic feedback mechanism configured to output one or more signals indicating the quantified amount of the pressure; and a pressure sensing module configured to receive the one or more signals from the plurality of pressure sensors indicating the quantified amount of the pressure by the one or more piezos and control haptic feedback of the haptic feedback mechanism by energizing one or more piezos based at least in part on the quantified amount of pressure.

An example as described alone or in combination with any of the other examples described above or below, wherein the plurality of pressure sensors utilize the one or more piezos to detect and quantify the amount of the application of pressure.

An example as described alone or in combination with any of the other examples described above or below, wherein the one or more signals are summed from the plurality of pressure sensors.

An example as described alone or in combination with any of the other examples described above or below, wherein the one or more signals are received individually by the pressure sensing module from respective ones of the plurality of pressure sensors.

An example as described alone or in combination with any of the other examples described above or below, wherein the individually received signals are usable to determine a relative location of the object in relation to the outer surface by the pressure sensing module.

An example as described alone or in combination with any of the other examples described above or below, wherein the individually received signals include bipolar voltages that are measured differentially using diodes of the pressure sensing module.

An example as described alone or in combination with any of the other examples described above or below, wherein the pressure sensing module includes a capacitor that takes as an input the signal from the plurality of pressure sensors, the capacitor configured to be reset as part of the pressure sensing module to address voltage decay of the signal using a stored voltage offset.

In one or more examples, a trackpad system includes an outer surface configured to receive an application of pressure by an object and detect movement of the object in relation to the outer surface, the detected movement usable to control a cursor of a computing device; a pressure sensor and haptic feedback mechanism having a plurality of piezos that suspend the outer surface and are configured to detect and quantify an amount of the application of the pressure to the outer surface by the object, the pressure sensor and haptic feedback mechanism configured to output one or more signals indicating the quantified amount of the pressure; and a pressure sensing module configured to receive the one or more signals from the pressure sensors indicating the quantified amount of the pressure by the one or more piezos and control the haptic feedback of the haptic feedback mechanism by energizing the one or more piezos based at least in part of the quantified amount of pressure.

An example as described alone or in combination with any of the other examples described above or below, wherein the outer surface has a plurality of corners and the plurality of piezos are disposed at respective ones of the plurality of corners.

An example as described alone or in combination with any of the other examples described above or below, wherein the one or more signals are summed from the plurality of piezos.

An example as described alone or in combination with any of the other examples described above or below, wherein the one or more signals are received individually by the pressure sensing module from respective ones of the plurality of piezos.

An example as described alone or in combination with any of the other examples described above or below, wherein the individually received signals are usable to determine a relative location of the object in relation to the outer surface by the pressure sensing module.

An example as described alone or in combination with any of the other examples described above or below, wherein the individually received signals include bipolar voltages that are measured differentially using diodes of the pressure sensing module.

An example as described alone or in combination with any of the other examples described above or below, wherein the pressure sensing module includes a capacitor that takes as an input the signal from the pressure sensor, the capacitor is configured to be reset as part of the pressure sensing module to address voltage decay of the signal using a stored voltage offset.

In one or more examples, an input device includes an outer surface configured to receive an application of pressure by an object, a pressure sensor configured to detect and quantify an amount of the application of the pressure to the outer surface by the object, the pressure sensor configured to output a signal indicating the quantified amount of the pressure, a haptic feedback mechanism configured to provide haptic feedback using at least one piezo, and a pressure sensing module configured to receive the signal from the pressure sensors indicating the quantified amount of the pressure and control the haptic feedback of the haptic feedback mechanism by energizing the at least one piezo based at least in part of the quantified amount of pressure.

An example as described alone or in combination with any of the other examples described above or below, wherein the pressure sensor employs the at least one piezo of the haptic feedback mechanism to detect and quantify the amount of the application of the pressure.

An example as described alone or in combination with any of the other examples described above or below, wherein the haptic feedback mechanism includes a backer that deflects in response to a pulling motion of the at least one piezo due to the energizing of the at least one piezo.

An example as described alone or in combination with any of the other examples described above or below, further comprising a spacer configured to route the amount of pressure applied to the outer surface for application at a generally central region of the backer.

An example as described alone or in combination with any of the other examples described above or below, wherein the outer surface is formed as part of a trackpad that includes one or more sensors disposed thereon that are configured to detect proximity and movement of the object in relation to the outer surface.

An example as described alone or in combination with any of the other examples described above or below, wherein the at least one piezo is formed at least in part from a piezo ceramic material, PZT, electroactive polymer, or electromechanical polymer.

An example as described alone or in combination with any of the other examples described above or below, wherein the pressure sensing module includes a capacitor that takes as an input the signal from the pressure sensor, the capacitor is configured to be reset as part of the pressure sensing module to address voltage decay of the signal using a stored voltage offset.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An input device comprising:
   an outer surface configured to receive an application of a pressure by an object;
   one or more pressure sensing and haptic feedback mechanisms comprising a piezo, the piezo configured to:
   sense an amount of the pressure applied to the outer surface by the object;
   generate a pressure signal corresponding to the amount of the pressure; and
   produce a haptic effect at the outer surface when energized; and
   a pressure sensing and haptic feedback module configured to:
   store a voltage value from the piezo, the voltage value based on deflection of the piezo from the pressure by the object on the outer surface;
   discharge, after storing the voltage value, a capacitance of the piezo based on pressure on the piezo occurring for a defined amount of time; and
   apply, in association with discharging the capacitance of the piezo, the voltage value as a pressure reading for the piezo.

2. The input device as described in claim 1, further comprising:
   a spacer coupled to the outer surface; and
   a backer coupled to the spacer and connected to the piezo such that the backer deflects in response to a pulling motion of the piezo due to energizing of the piezo.

3. The input device as described in claim 1, wherein the one or more pressure sensing and haptic feedback mechanisms include at least one other piezo, and wherein the input device is configured to measure the pressure signal from the piezo and measure a different pressure signal from the at least one other piezo to calculate a location of the object on the outer surface.

4. The input device as described in claim 1, wherein the pressure sensing and haptic feedback module is configured to successively transmit signals to discharge the piezo on a periodic basis.

5. The input device as described in claim 1, wherein a press and hold gesture of the object on the outer surface causes the pressure signal to exceed a pressure threshold.

6. The input device as described in claim 1, wherein a press and hold gesture of the object on the outer surface causes the pressure signal to exceed a pressure threshold, and wherein when the press and hold gesture is released, the pressure signal is applied such that zero pressure is sensed by the piezo.

7. The input device as described in claim 1, wherein a press and hold gesture of the object on the outer surface causes the pressure signal to exceed a pressure threshold, and wherein the pressure sensing and haptic feedback module is configured to transmit the pressure signal to discharge the piezo in response to detecting the pressure signal for the defined amount of time.

8. The input device as described in claim 1, further comprising a keyboard and a trackpad, and wherein the outer surface represents a portion of the trackpad.

9. The input device as described in claim 1, further comprising a magnetic coupling device that is usable to connect the input device to a computing device.

10. A trackpad system comprising:
    an outer surface configured to receive an application of a pressure by an object and detect movement of the object in relation to the outer surface, the detected movement usable to provide input to a computing device;
    one or more pressure sensing and haptic feedback mechanisms comprising a piezo, the piezo configured to:
    sense an amount of the pressure applied to the outer surface by the object;
    generate a pressure signal corresponding to the amount of the pressure; and
    produce a haptic effect at the outer surface when energized; and a pressure sensing and haptic feedback module configured to:
- store a voltage value from the piezo, the voltage value based on deflection of the piezo from the pressure by the object on the outer surface;
- discharge, after storing the voltage value, a capacitance of the piezo based on pressure on the piezo occurring for a defined amount of time; and
- apply, in association with discharging the capacitance of the piezo, the voltage value as a pressure reading for the piezo.

11. The trackpad system as described in claim 10, further comprising:
- a spacer coupled to the outer surface; and
- a backer coupled to the spacer and connected to the piezo such that the backer deflects in response to a pulling motion of the piezo due to energizing of the piezo.

12. The trackpad system as described in claim 10, wherein the pressure sensing and haptic feedback module is configured to successively transmit signals to discharge the piezo on a periodic basis.

13. The trackpad system as described in claim 10, wherein a press and hold gesture of the object on the outer surface causes pressure signal to exceed a pressure threshold.

14. The trackpad system as described in claim 10, wherein a press and hold gesture of the object on the outer surface causes the pressure signal to exceed a pressure threshold, and wherein when the press and hold gesture is released, the pressure signal is applied such that zero pressure is sensed by the piezo.

15. The trackpad system as described in claim 10, wherein a press and hold gesture of the object on the outer surface causes the pressure signal to exceed a pressure threshold, and wherein the pressure sensing and haptic feedback module is configured to transmit the pressure signal to discharge the piezo in response to detecting the pressure signal for the defined amount of time.

16. A method comprising:
controlling one or more piezos to:
- sense an amount of a pressure applied by an object to an outer surface of an input device in which the one or more piezos are disposed;
- generate a pressure signal corresponding to the amount of the pressure;
- produce a haptic effect at the outer surface responsive to the one or more piezos being energized; and controlling a pressure sensing and haptic feedback module to:
- store a voltage value from the piezo, the voltage value based on deflection of the piezo from the pressure by the object on the outer surface;
- discharge, after storing the voltage value, a capacitance of the piezo based on pressure on the piezo occurring for a defined amount of time; and
- apply, in association with discharging the capacitance of the piezo, the voltage value as a pressure reading for the piezo.

17. The method as recited in claim 16, further comprising controlling the pressure sensing and haptic feedback module to successively transmit signals to discharge the piezo on a periodic basis.

18. The method as recited in claim 16, wherein a press and hold gesture of the object on the outer surface causes pressure signal to exceed a pressure threshold, and wherein when the press and hold gesture is released, the method further comprises controlling the pressure sensing and haptic feedback module to apply the pressure signal such that zero pressure is sensed by the piezo.

19. The method as recited in claim 16, further comprising controlling the pressure sensing and haptic feedback module to transmit a signal to discharge the piezo in response to detecting the pressure signal for the defined amount of time.

20. The method as recited in claim 16, further comprising measuring the pressure signal and at least one other pressure signal from the one or more piezos to calculate a location of the object on the outer surface.

* * * * *